US011128909B2

United States Patent
Cho et al.

(10) Patent No.: US 11,128,909 B2
(45) Date of Patent: Sep. 21, 2021

(54) IMAGE PROCESSING METHOD AND DEVICE THEREFOR

(71) Applicant: Samsung Electronics Co., Ltd., Suwon-si (KR)

(72) Inventors: Jung-hoon Cho, Seoul (KR); Seung-chan Kim, Seoul (KR); Yong-nam Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 16/635,358

(22) PCT Filed: Mar. 19, 2018

(86) PCT No.: PCT/KR2018/003149
§ 371 (c)(1),
(2) Date: Jan. 30, 2020

(87) PCT Pub. No.: WO2019/031676
PCT Pub. Date: Feb. 14, 2019

(65) Prior Publication Data
US 2021/0092472 A1    Mar. 25, 2021

(30) Foreign Application Priority Data

Aug. 9, 2017  (KR) .................... 10-2017-0101345

(51) Int. Cl.
*H04N 21/431*    (2011.01)
*H04N 5/58*    (2006.01)
*H04N 21/482*    (2011.01)

(52) U.S. Cl.
CPC .......... *H04N 21/4312* (2013.01); *H04N 5/58* (2013.01); *H04N 21/4821* (2013.01)

(58) Field of Classification Search
CPC ... H04N 21/4312; H04N 21/4821; H04N 5/58
See application file for complete search history.

(56) References Cited

U.S. PATENT DOCUMENTS 5,267,331 A    11/1993  Siwoff
8,947,468 B2    2/2015  Kim et al.
(Continued)

FOREIGN PATENT DOCUMENTS

EP    2 372 680 A2    10/2011
EP    2 372 680 A3    11/2011
(Continued)

OTHER PUBLICATIONS

Yuhang Zhao et al:"ForeSee", Computers & Accessibility, ACM, 2 Pennplaza, Suite 7010 New York NY 10121-0701 USA, (Oct. 26, 2015), XP058077122.
(Continued)

*Primary Examiner* — Oschta I Montoya
(74) *Attorney, Agent, or Firm* — Jefferson IP Law, LLP

(57) ABSTRACT

Provided is a device including: a controller configured to obtain illumination information about illumination around the device, determine, based on the illumination information, a thickness of an outline of an object included in content reproduced by the device, and perform image processing on the content such that the outline of the object is represented as having the determined thickness; and a display displaying the content on which the image processing is performed.

16 Claims, 40 Drawing Sheets

(a)

(b)

(56) References Cited

U.S. PATENT DOCUMENTS

| | | | |
|---|---|---|---|
| 10,444,503 B2 | 10/2019 | Joo et al. | |
| 2002/0186221 A1* | 12/2002 | Bell | G06F 3/0425 |
| | | | 345/474 |
| 2003/0081836 A1* | 5/2003 | Averbuch | G06T 7/215 |
| | | | 382/199 |
| 2005/0195317 A1* | 9/2005 | Myoga | H04N 5/2354 |
| | | | 348/370 |
| 2008/0088123 A1* | 4/2008 | Jeon | A63F 3/065 |
| | | | 283/56 |
| 2008/0231563 A1* | 9/2008 | Kim | G09G 5/14 |
| | | | 345/80 |
| 2010/0013938 A1* | 1/2010 | Fukuda | H04N 7/18 |
| | | | 348/208.4 |
| 2014/0330813 A1 | 11/2014 | Lee et al. | |

FOREIGN PATENT DOCUMENTS

| | | |
|---|---|---|
| JP | 2015-057659 A | 3/2015 |
| KR | 10-2009-0105531 A | 10/2009 |
| KR | 10-2011-0100056 A | 9/2011 |
| KR | 10-2014-0131166 A | 11/2014 |
| KR | 10-2015-0023106 A | 3/2015 |
| KR | 10-2016-0059264 A | 5/2016 |
| KR | 10-1659041 B1 | 9/2016 |

OTHER PUBLICATIONS

Extended European Search Report dated Jul. 24, 2020, issued in European Application No. 18845026.6.
International Search Report dated Jun. 22, 2018, issued in International Application No. PCT/KR2018/003149.

* cited by examiner (a)  (b)

(a) (b)

FIG. 7
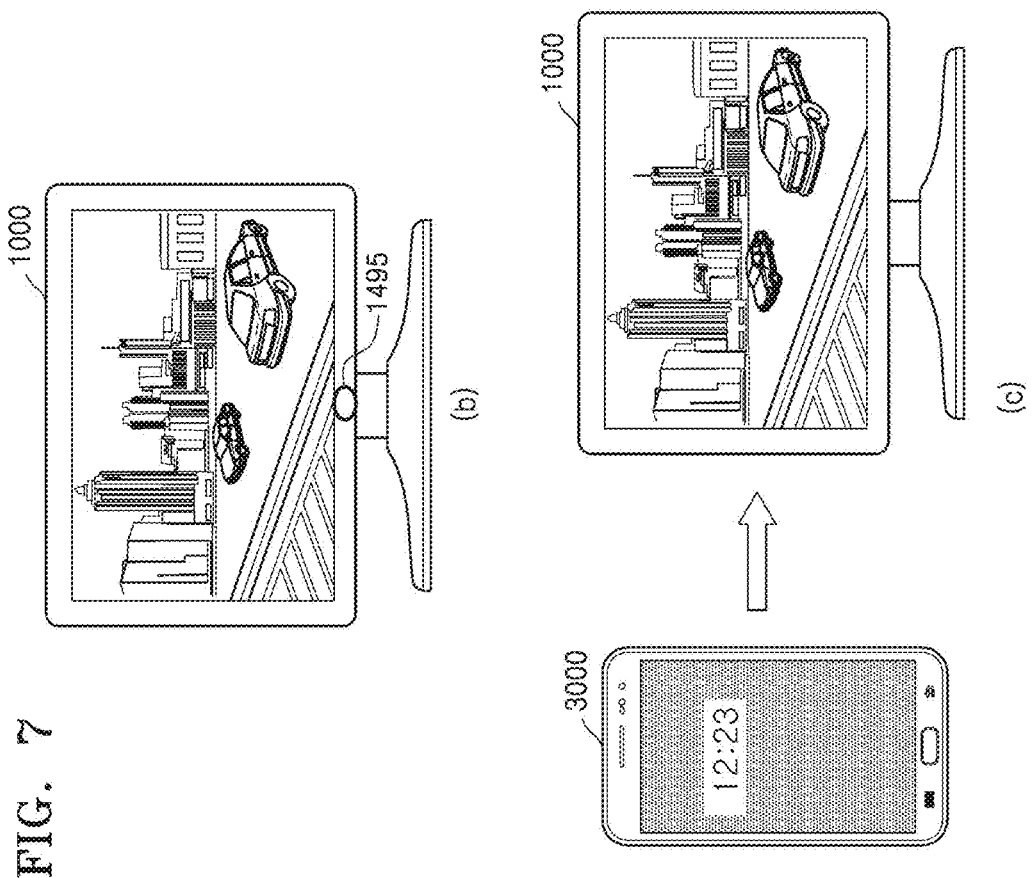
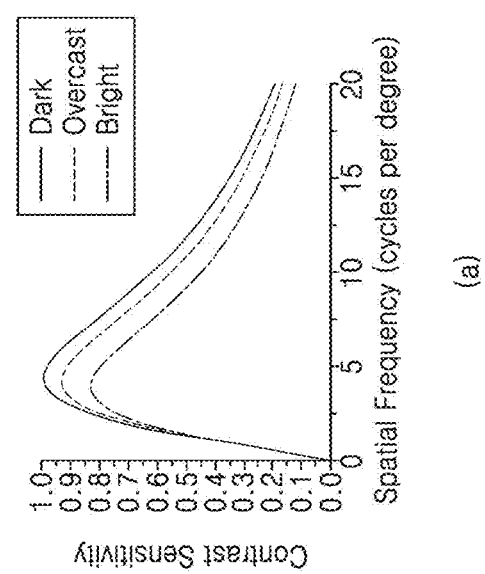

FIG. 10
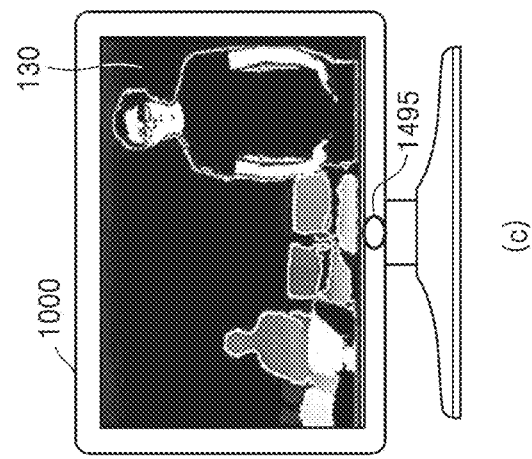
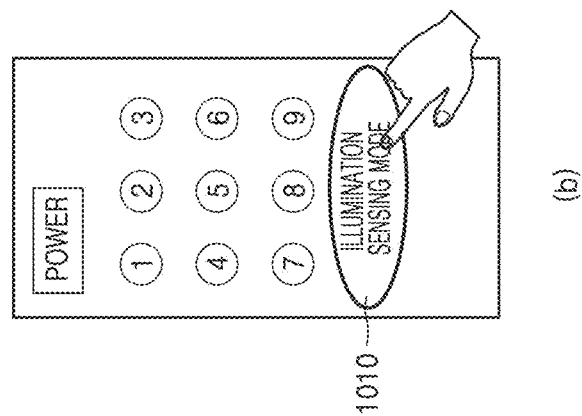
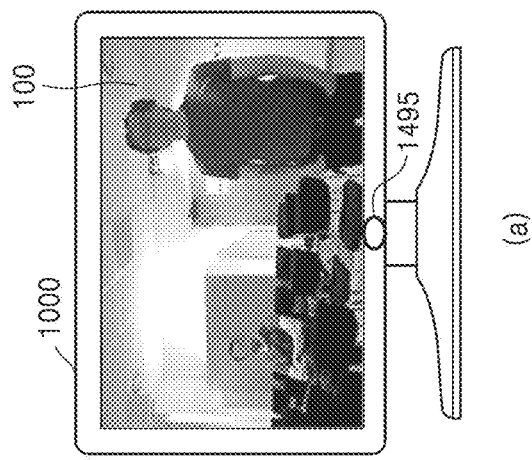

(a)  (b)

(a)          (b)

(a)          (b)

IMAGE PROCESSING METHOD AND DEVICE THEREFOR

TECHNICAL FIELD

The present disclosure relates to a user interface, a method, and an apparatus for changing an image to be displayed according to a user's situation and displaying the changed image.

BACKGROUND ART

With developments in network and multimedia technologies, users are able to view images, such as photos, movies, or broadcasting, anytime and anywhere.

However, for some users, due to problems, such as low vision, age-related macular degeneration, or reduced contrast sensitivity, an image displayed on a display device, such as a cellular phone or a television (TV), may appear distorted, or the users may be unable to recognize even an object in the image.

Also, due to peripheral illumination of the device, a normal user also sometimes cannot normally view a displayed image. For example, it may be difficult for a user to identify an image displayed on a mobile device under sunlight during midday.

DESCRIPTION OF EMBODIMENTS

Technical Problem

According to one or more embodiments, a device and a method for increasing a recognition rate of content by changing an image to be displayed according to peripheral illumination of the device are provided.

Also, according to one or more embodiments, a device and a method for increasing a recognition rate of content by changing an image to be displayed according to a user's vision are provided.

BRIEF DESCRIPTION OF DRAWINGS

FIG. 7 illustrates a method, performed by a device, of obtaining peripheral illumination information of the device, according to one or more embodiments.

FIGS. 10 and 11 illustrate a method, performed by a device, of receiving a user's input for changing an image according to peripheral illumination of the device, according to one or more embodiments.

BEST MODE

Figure 1:
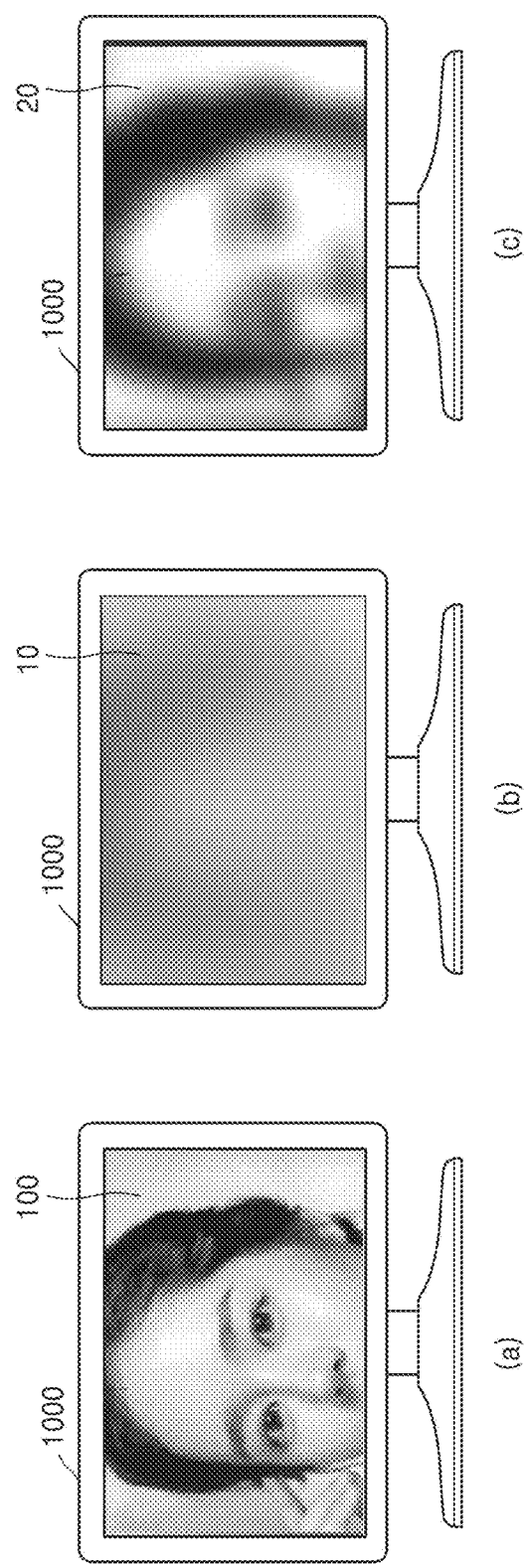
FIG. 1 is a view showing an example in which a device changes an image according to user environmental information or user vision information, according to one or more embodiments.

According to an aspect of the present disclosure, a device includes: a controller configured to obtain illumination information about illumination around the device, determine, based on the illumination information, a thickness of an outline of an object included in content reproduced by the device, and perform image processing on the content such that the outline of the object is represented as having the determined thickness; and a display displaying the content on which the image processing is performed.

The controller may further be configured to detect a color of the object and represent the outline of the object by using a complementary color of the color of the object.

Also, the device may further include a storage storing color information about a set of colors for which a user's color contrast sensitivity is equal to or less than a reference value. The controller may further be configured to detect the color of the object and a color of a background of the object, and when the detected color of the object and the detected color of the background of the object are the set of colors, the controller may further be configured to perform image processing on the content such that the outline of the object is represented as having the complementary color of the color of the object.

Also, the controller may further be configured to detect text from the content and represent the text by using a first color and represent a background of the text by using a second color.

Also, the controller may further be configured to determine a contrast range of a first frame of the reproduced content and a second frame that is a frame next to the first frame and represent an outline of an object included in the second frame as having a thickness corresponding to the contrast range.

Also, the controller may further be configured to determine the thickness of the outline to be thicker as obtained illumination is higher.

Also, the controller may further be configured to determine the thickness of the outline by further taking into account a user's brightness contrast sensitivity.

Also, the controller may further be configured to detect a plurality of objects in the content, determine a brightness value corresponding to each of the plurality of objects, and perform image processing on the content such that each object is represented as having the corresponding brightness value.

Also, when the reproduced content is a broadcasting program, the controller may further be configured to detect at least one keyword from electronic program guide (EPG) information about the broadcasting program, and when the text indicates the detected at least one keyword, the controller may further be configured to represent the text by using the first color and represent the background of the text by using the second color.

Also, the controller may further be configured to represent the text by using the first color and represent the background of the text by using the second color, based on a location and a size of the text.

Mode of Disclosure

Hereinafter, embodiments of the disclosure will now be described more fully with reference to the accompanying drawings for one of ordinary skill in the art to be able to perform the disclosure without any difficulty. The disclosure may, however, be embodied in many different forms and should not be construed as being limited to the embodiments of the disclosure set forth herein. Also, parts in the drawings unrelated to the detailed description are omitted to ensure clarity of the disclosure, and like reference numerals in the drawings denote like elements.

Throughout the specification, it will be understood that when an element is referred to as being "connected" to another element, it may be "directly connected" to the other element or "electrically connected" to the other element with intervening elements therebetween. Throughout the specification, when a part "includes" an element, it is to be understood that the part additionally includes other elements rather than excluding other elements as long as there is no particular opposing recitation.

Hereinafter, the disclosure will be described in detail with reference to the accompanying drawings.

FIG. 1 is a view showing an example in which a device 1000 changes an image according to user environmental information or user vision information, according to one or more embodiments.

Referring to (a) of FIG. 1, the device 1000 may display an original image 100.

Referring to (b) of FIG. 1, when the illumination is equal to or greater than a threshold value or when there is an abnormality in the sight function of a user, the original image 100 illustrated in (a) of FIG. 1 may be viewed by the user as a dim image 10.

For example, when a user watches a cellular phone under the midday sun, the user may have difficulty normally recognizing an object in an image displayed on the cellular phone. Also, for example, in the case of a user having low contrast sensitivity, it may be difficult to normally recognize an object in an image that is displayed.

Referring to (c) of FIG. 1, the device 1000 may perform image processing on the original image 100 according to user environmental information and user vision information and may generate and display an image 20 that is easy to recognize.

Figure 2:
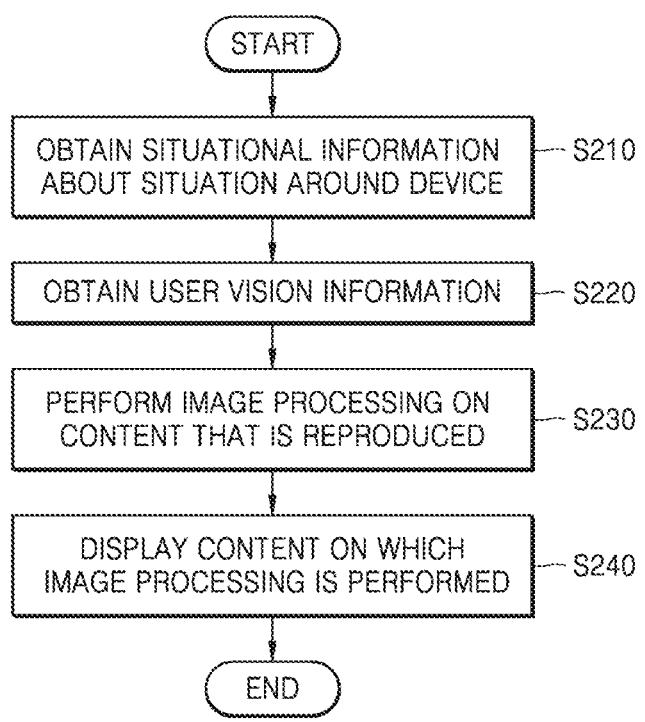
FIG. 2 is a flowchart of a method, performed by a device, of displaying an image, based on situational information about a situation around the device or user vision information, according to one or more embodiments.

FIG. 2 is a flowchart of a method, performed by the device 1000, of displaying an image, based on situational information about a situation around the device 1000 or user vision information, according to one or more embodiments.

In operation S210, the device 1000 may obtain the situational information about the situation around the device 1000.

The situational information about the situation around the device 1000 may include, for example, illumination information, place information, and time information, but it is not limited thereto. The device 1000 may obtain the situational information about the situation around the device 1000 by using a sensor included in the device 1000.

In operation S220, the device 1000 may obtain the user vision information.

The user vision information may include contrast sensitivity, vision, color weakness, and sight function information of a user, but it is not limited thereto. The contrast sensitivity may include brightness contrast sensitivity and color contrast sensitivity.

The device 1000 may receive the user vision information from the user.

In operation S230, the device 1000 may perform image processing on content that is reproduced.

The content may be an image or a video. Also, the content may be stored in the device 1000 and may be received from an external server. When the content is a video, the device 1000 may perform real-time image processing on frames in the video and display an image on which the image processing is performed based on time stamp values.

The device 1000 may perform the image processing on the content that is reproduced, based on at least one of the situational information about the situation around the device 1000 and the user vision information.

For example, when the peripheral illumination of the device 1000 is equal to or greater than a threshold value or when the user's contrast sensitivity is equal to or less than a threshold value, the device 1000 may perform image processing on the content for the user to easily recognize an object in the content.

The object may denote all types of things which may be separately recognized by a user. For example, when the content is a photo obtained by capturing an object, the object may be the captured object. Also, when the content is an animation, the object may be a figure represented in the animation image. Also, when the content is a graphics user interface (GUI) image, the object may be a piece of text, a button, etc. in the GUI image.

The image processing on the content may denote image processing on an image included in the content. For example, when the content is a video, the device 1000 may perform image processing on a frame in the video.

The image processing on the image may denote applying a mathematical filter to a pixel included in the image. Also, the image processing on the image may denote detecting information from the image and generating a new image based on the detected information.

For an object in the content to be easily recognized, the device 1000 may apply an adaptive threshold filter. The adaptive threshold filter will be described below with reference to (a) and (b) of FIG. 3.

Also, the device 1000 may recognize an object in the content and generate an image in which the recognized object is represented by using brightness contrast. Throughout the specification, a method of recognizing an object in content and representing the recognized image by using brightness contrast may be referred to as a contrast filter. The contrast filter will be described below with reference to (a) and (b) of FIG. 4.

Also, for an object in the content to be easily recognized, the device 1000 may generate an image in which the object recognized in the content is represented by using the brightness contrast by applying a contrast filter to the content, and an outline of the recognized object is indicated, in addition to the brightness contrast. This method will be described below with reference to (a) and (b) of FIG. 5.

In operation S240, the device 1000 may display the content on which image processing is performed.

Figure 3:
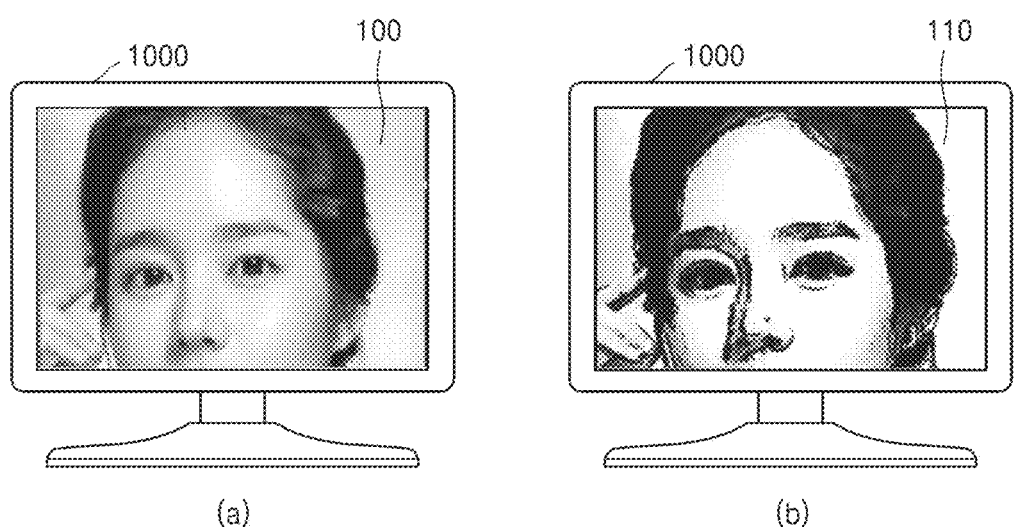
FIGS. 3 through 5 are views showing a method, performed by a device, of performing image processing on content, according to one or more embodiments.
Figure 4:
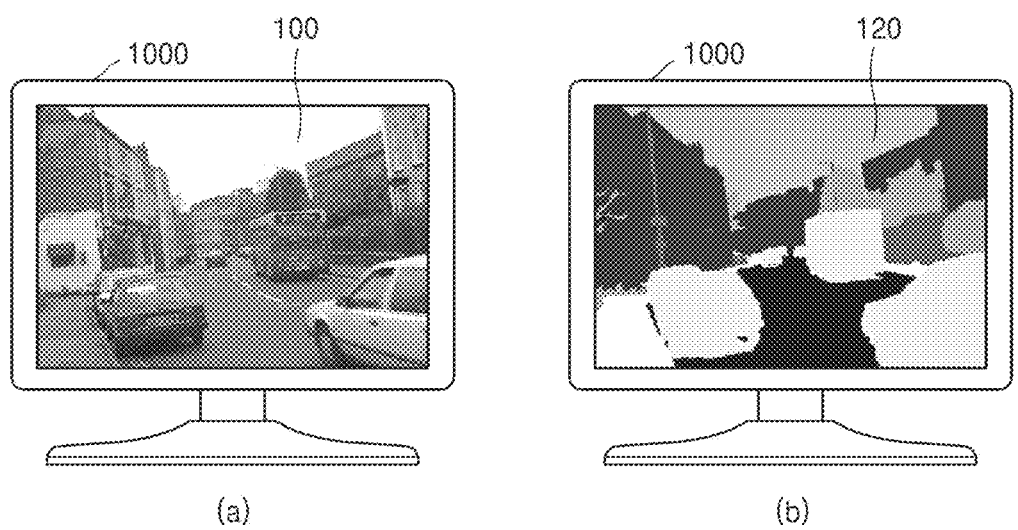
Figure 5:
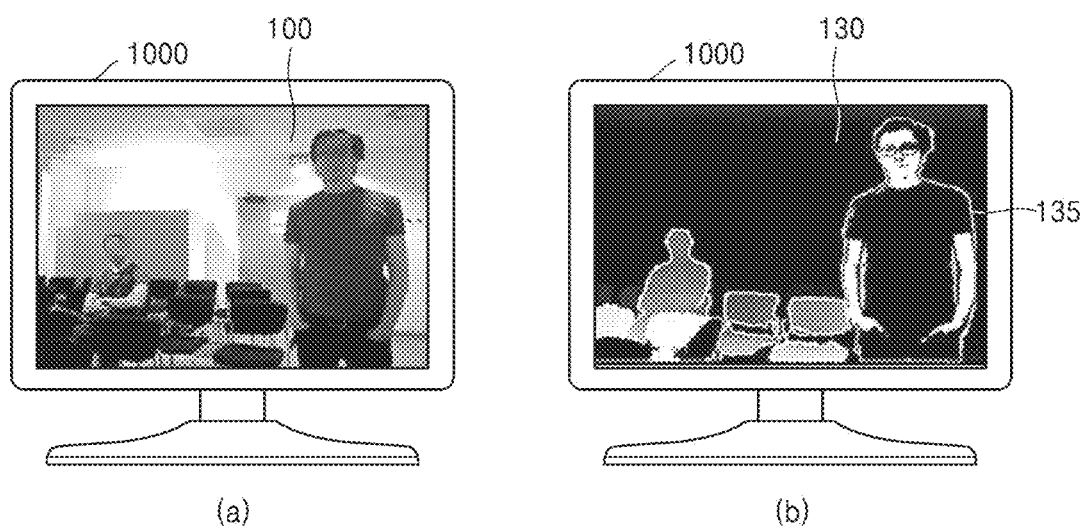

FIGS. 3 through 5 are views showing a method, performed by the device 1000, of performing image processing on content, according to one or more embodiments.

Referring to (a) and (b) of FIG. 3, the device 1000 may change the original image 100 by using an adaptive threshold filter.

The adaptive threshold filter may include a cartoon filter and an edge enhancement filter.

The cartoon filter may denote a filter for representing an object in an image by cartoonizing the object. For example, the device 1000 may detect an outline of an object in the original image 100 by applying the cartoon filter to the original image 100 and may generate a cartoon image which is a simplified image in which areas that are segmented by the detected outline have reduced differences in color, brightness, and chroma among one another.

The cartoon filter may include a filter for removing noise in an image without blurring the image (for example, a media filter or a bilateral filter), a color image segmentation filter, an edge detection filter, etc.

As the cartoon image is generated, the device may generate an adaptive threshold filter image 110 in which an outline of an object in the cartoon image is indicated to be thick by applying an edge enhancement filter to the cartoon image.

It is identified that in the adaptive threshold filter image 110, objects in the original image 100, which include a head, eyebrows, eyes, a nose, and a facial outline, are indicated to be thicker and darker than in the original image 100, and areas indicating the skin of a face have reduced differences in the color, brightness, and chroma.

Referring to (a) and (b) of FIG. 4, the device 1000 may change the original image 100 such that objects in the original image 100 are segmented by using a brightness contrast.

For example, the device 1000 may determine an area of at least one object in the original image 100. Referring to (a) of FIG. 4, the device 1000 may determine an area occupied by a bus in the original image as an area of a first object and an area occupied by a street in the original image as an area of a second object. Further, the device 1000 may recognize each of the objects. For example, the device 1000 may recognize that the first object corresponds to a bus.

The device 1000 may determine a brightness corresponding to each object. In this case, the device 1000 may determine the brightness corresponding to each object such that objects that are adjacent to each other have a great brightness difference. For example, the white color may be determined for the first object and the black color may be determined for the second object adjacent to the first object.

Also, the device 1000 may represent an object as having a high brightness and a background of the object as having a low brightness. Also, the device 1000 may represent the same types of objects as having an identical brightness and different types of objects as having different brightnesses. For example, the device 1000 may represent all the automobiles as having a first brightness and all the buildings as having a second brightness. The device 1000 may generate a brightness contrast image 120 in which each of objects is indicated by using only a brightness corresponding to each object. Thus, a user may infer an object indicated by an image only through the brightness contrast image 120.

A general user may not easily recognize an object through the brightness contrast image 120. However, for a user having very limited contrast sensitivity, the color, the gradient, or the outline may make few differences, and thus, the user with the limited contrast sensitivity may more easily identify a shape of an object from the brightness contrast image 120 than from the original image 100.

Referring to (a) and (b) of FIG. 5, the device 1000 may change the original image 100 such that objects in the original image 100 may be distinguished through the brightness contrast and outlines.

For example, the device 1000 may generate a brightness contrast image 130 to which an outline is added, wherein, in the brightness contrast image 130, objects in the original image 100 are represented through the brightness contrast by applying a contrast filter to the original image 100 and an outline 135 of the objects are added to the objects represented through the brightness contrast. For example, the device 1000 may indicate the outline 135 of the object on the brightness contrast image by applying an edge enhancement filter to the brightness contrast image. Also, for example, the device 1000 may determine an area of an object from the original image 100, determine a line surrounding the determined area as an outline, and represent the determined outline on the brightness contrast image.

As the peripheral illumination of the device 1000 is increased or the user's vision is decreased, the device 1000 may represent the outline of the object as having an increase thickness. For example, the device 1000 may adjust the thickness of the outline of the object by adjusting a coefficient of the edge enhancement filter. Also, for example, the device 1000 may adjust the thickness of the outline of the object by changing a type of a filter applied to the device 1000. Also, for example, the device 1000 may determine an outline of an object and represent the determined outline as having a selected thickness on an image on which image processing is performed.

According to one or more other embodiments, the device 1000 may recognize an object in the original image 100 and add an outline of the recognized object to the original image 100, in order to generate an image for increasing a recognition rate of the object.

Also, according to one or more other embodiments, the device 1000 may apply a cartoon filter to the original image 100 and add an outline of a recognized object to an image generated by applying the cartoon filter, in order to generate an image for increasing a recognition rate of the object.

The device 1000 may apply different filters to the original image 100 according to a user's contrast sensitivity. For example, when the user's contrast sensitivity is equal to or less than an average, the device 1000 may apply a cartoon filter to the original image 100, and when the user's contrast sensitivity is very low, the device 1000 may apply a contrast filter to the original image 100. By doing so, a user having low vision, age-related macular degeneration, and low contrast sensitivity may recognize an object in an image.

Also, the device 1000 may apply different filters to the original image 100 according to a peripheral illumination of the device 1000. For example, when the device 1000 is in the outdoors without direct light, the device 1000 may apply a cartoon filter to the original image 100, and when the device 1000 is in the outdoors with direct light, the device 1000 may apply a contrast filter to the original image 100.

Also, according to an embodiment, as the illumination is increased, the device 1000 may increase a contrast range to increase the visibility. A technique of increasing the contrast range may be referred to as a high dynamic range (HDR), and as the contrast range is increased, the brightness of the image may be more closely represented.

The device 1000 may include a television (TV) and may be a mobile device carried by a user. Also, the device 1000 may include a monitor, a tablet, a projector, a settop box, or a dongle. However, it is not limited thereto.

Figure 6:
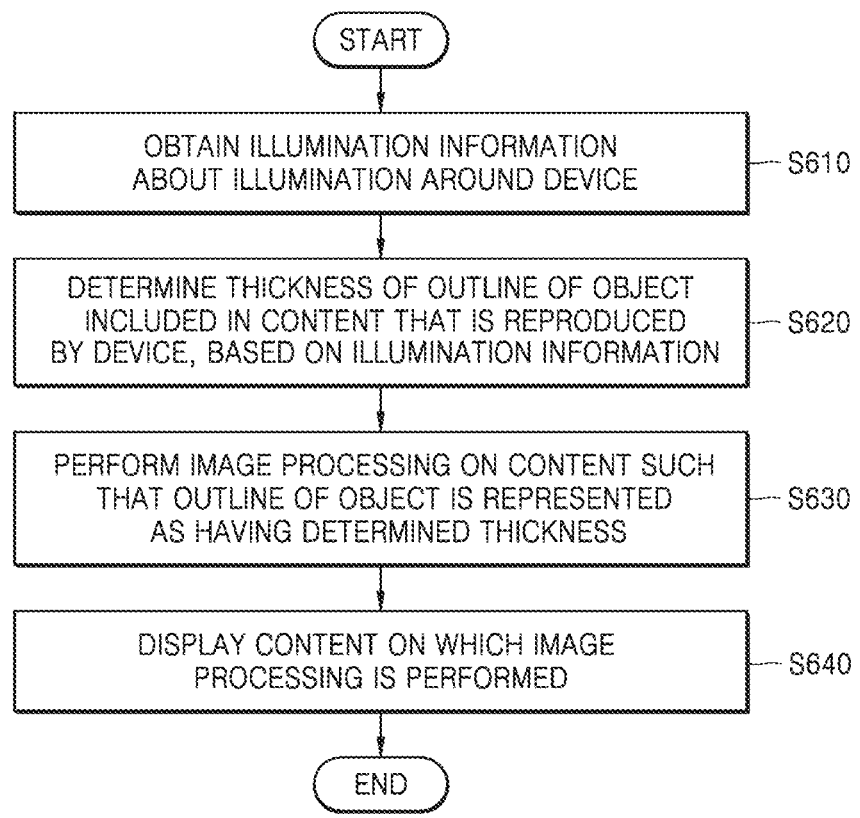
FIG. 6 is a flowchart of a method, performed by a device, of changing an image so that a user may easily recognize an object in the image, by adjusting a thickness of an outline of the object in the image, according to peripheral illumination of the device, according to one or more embodiments.

FIG. 6 is a flowchart of a method, performed by the device 1000, of changing an image so that a user may easily recognize an object in the image, by adjusting a thickness of an outline of the object in the image, according to peripheral illumination of the device 1000, according to one or more embodiments.

In operation S610, the device 1000 may obtain the peripheral illumination information of the device 1000.

The device 1000 may obtain the peripheral illumination information of the device 1000 by controlling an illumination sensor included in the device 1000. Also, the device 1000 may receive the illumination information from another device with which the device 1000 is connected via short-range wireless communication.

In operation S620, the device 1000 may determine a thickness of an outline of an object included in content that is reproduced in the device 1000, based on the illumination information of the device 1000.

When the illumination around the device 1000 is equal to or greater than a first threshold value, the device 1000 may determine the thickness of the outline of the object included in the content as a first thickness. Also, for example, the device 1000 may determine the thickness of the outline of the object included in the content to be proportional with respect to the illumination around the device 1000.

In operation S630, the device 1000 may perform image processing on the content such that the outline of the object is represented by using a line having the determined thickness.

The device 1000 may adjust a coefficient of an image filter to be applied to an original image such that the outline of the object is represented by using the line having the determined thickness. Also, the device 1000 may detect the outline of the object in the original image and may generate an image in which the detected outline of the object is indicated as the line having the determined thickness.

In operation S640, the device 1000 may display the content on which the image processing is performed.

The device 1000 may display the content on which the image processing is performed on a display included in the device 1000. Also, the device 1000 may request another device with which the device 1000 is connected via short-range wireless communication to display the content on which the image processing is performed.

FIG. 7 illustrates a method, performed by the device 1000, of obtaining peripheral illumination information of the device 1000, according to one or more embodiments.

(a) of FIG. 7 indicates a recognition contrast curve with respect to a spatial frequency according to peripheral illumination. Referring to the curve of (a) of FIG. 7, it is identified that as the illumination is increased, the contrast sensitivity is decreased. Thus, as the illumination is increased, it is more difficult to identify an object displayed on a display. Based on these characteristics, when watching TV in an office having high illumination or watching TV during the day, the color may be dim and hazy and definition may be decreased. These characteristics are also applied to the case where a screen of a cellular phone is not viewed well in a bright outdoor space. Also, the decreased sensitivity in correspondence to the increased illumination may be experienced by all displays.

Referring to (b) of FIG. 7, the device 1000 may control an illumination sensor 1495 included in the device 1000 to sense an illumination around the device 1000.

Referring to (c) of FIG. 7, the device 1000 may receive illumination information from another device 3000 with which the device 1000 is connected via short-range wireless communication.

Figure 8:
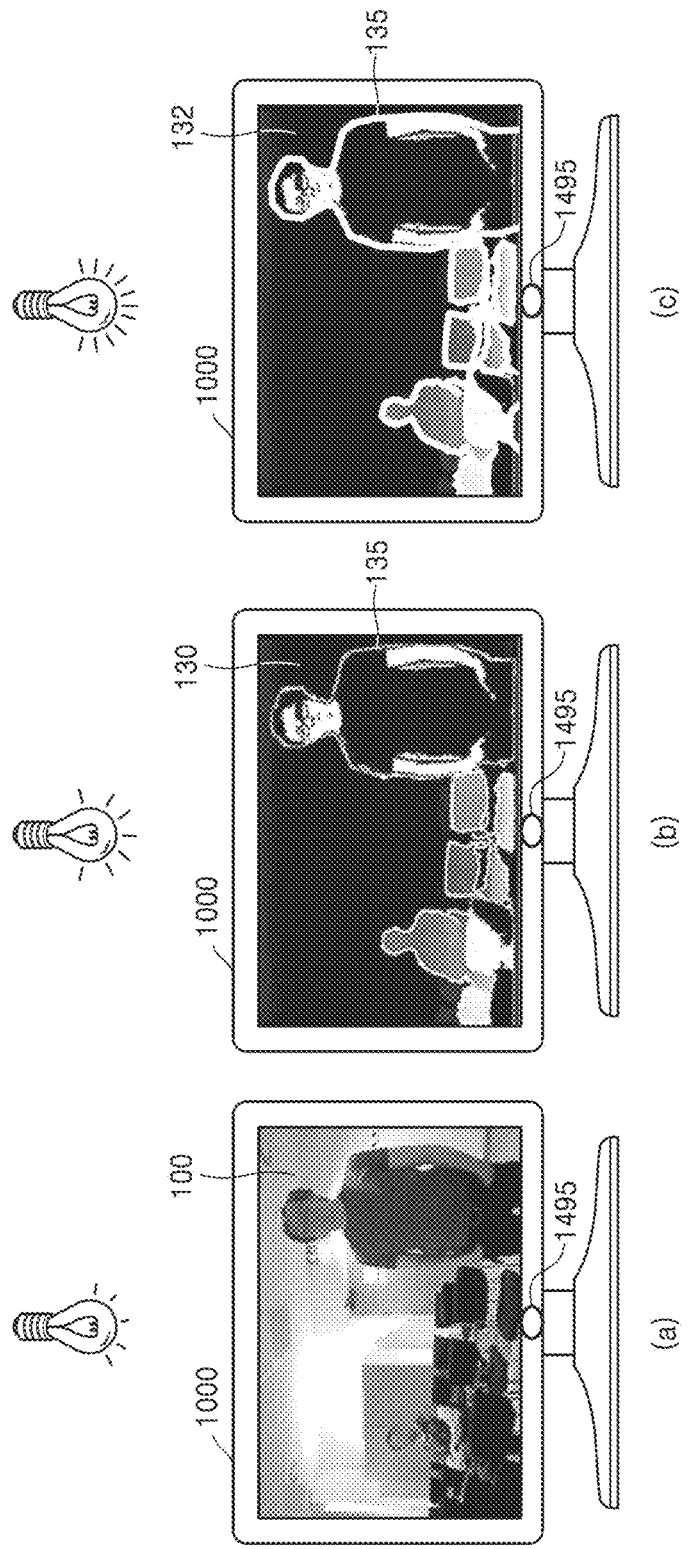
FIG. 8 illustrates a method, performed by a device, of changing an image so that a user may easily recognize an object in the image, by adjusting a thickness of an outline of the object in the image, according to peripheral illumination of the device, according to one or more embodiments.

FIG. 8 illustrates a method, performed by the device 1000, of changing an image so that a user may easily recognize an object in the image, by adjusting a thickness of an outline of the object in the image, according to peripheral illumination of the device 1000, according to one or more embodiments.

Referring to (a) through (c) of FIG. 8, the device 1000 may sense a peripheral illumination of the device 1000 and may display the outline of the object as having an increased thickness as the sensed illumination is increased.

Referring to (a) of FIG. 8, the device 1000 may display the original image 100 and may control the illumination sensor 1495 to sense the peripheral illumination of the device 1000.

Referring to (b) of FIG. 8, when it is determined that the sensed illumination is equal to or greater than a first threshold value, the device 1000 may apply a contrast filter to the original image 100 and display an image 132 indicating the outline 135 of the object as a first thickness.

Referring to (c) of FIG. 8, when it is determined that the sensed illumination is equal to or greater than a second threshold value that is greater than the first threshold value, the device 1000 may apply a contrast filter to the original image 100 and display an image 134 indicating the outline 135 of the object as a second thickness that is greater than the first thickness.

(a) through (c) of FIG. 8 illustrate the method, performed by the device 1000, of recognizing the object from the original image, and representing the recognized object by using brightness contrast and the outline. However, according to an embodiment, the device 1000 may represent the outline on the original image and adjust a thickness of the outline according to illumination.

Figure 9:
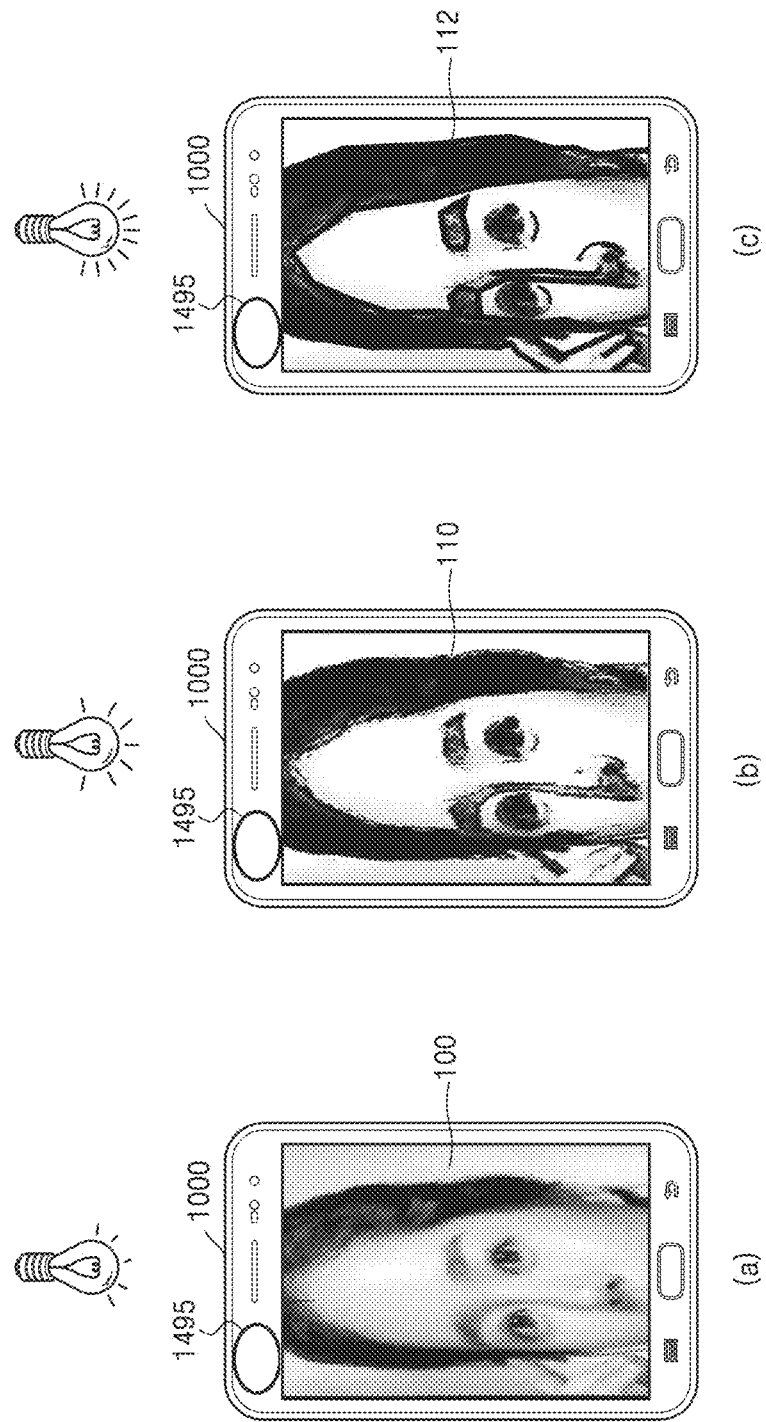
FIG. 9 illustrates a method, performed by a device, of changing an image so that a user may easily recognize an object in the image, by adjusting a thickness of an outline of the object in the image, according to peripheral illumination of the device, according to one or more other embodiments.

FIG. 9 illustrates a method, performed by the device 1000, of changing an image so that a user may easily recognize an object in the image, by adjusting a thickness of an outline of the object in the image, according to peripheral illumination of the device 1000, according to one or more other embodiments.

Referring to (a) through (c) of FIG. 9, the device 1000 may sense a peripheral illumination of the device 1000 and may display the outline of the object as having an increased thickness as the sensed illumination is increased.

Referring to (a) of FIG. 9, the device 1000 may display the original image 100 and may control the illumination sensor 1495 to sense the peripheral illumination of the device 1000.

Referring to (b) of FIG. 9, when it is determined that the sensed illumination is equal to or greater than a first threshold value, the device 1000 may apply a cartoon filter to the original image 100 and display an image 112 indicating the outline of the object as a first thickness by using an edge enhancement filter.

Referring to (c) of FIG. 9, when it is determined that the sensed illumination is equal to or greater than a second threshold value that is greater than the first threshold value, the device 1000 may apply a cartoon filter to the original image 100 and display an image 114 indicating the outline f the object as a second thickness by using an edge enhancement filter.

According to an embodiment, the device 1000 may enhance an edge by applying the edge enhancement filter to the original image. Also, as the sensed illumination is increased, the device 1000 may display an image indicating an increased thickness of the edge by adjusting a coefficient of the edge enhancement filter.

Figure 11:
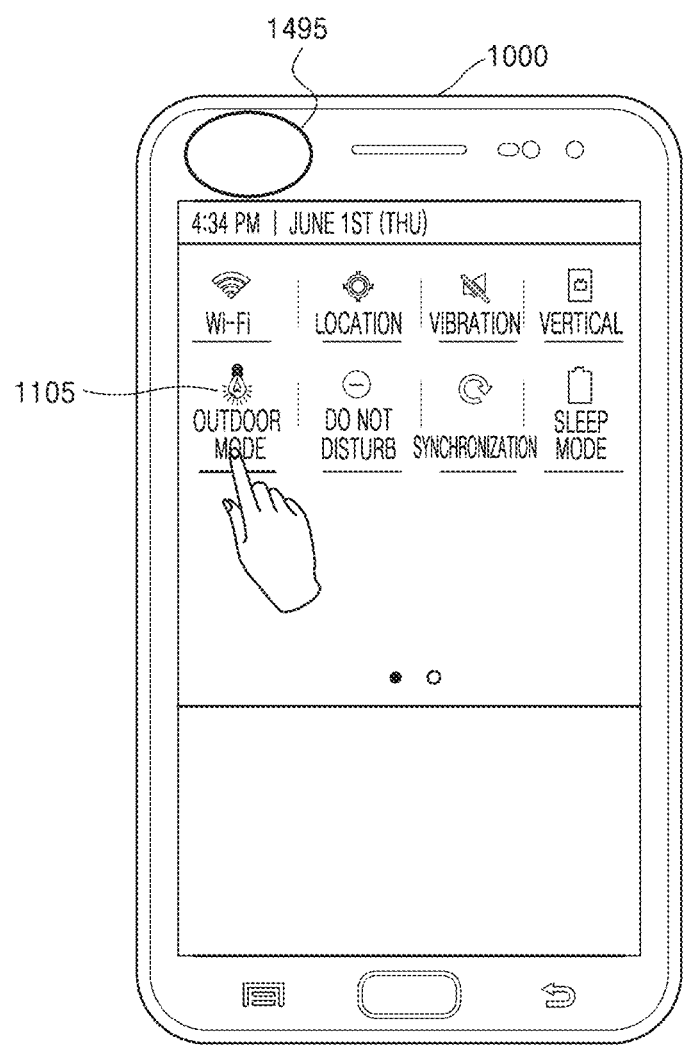

FIGS. 10 and 11 illustrate a method, performed by the device 1000, of receiving a user's input for changing an image according to peripheral illumination of the device 1000, according to one or more embodiments.

Referring to (a) of FIG. 10, the device 1000 may include a TV. Also, the TV 1000 may display a color image.

Referring to (b) of FIG. 10, a remote controller for controlling the TV 1000 may include a button 1010 for changing an image according to the peripheral illumination.

Referring to (c) of FIG. 10, when a user's input for selecting the button 1010 in the remote controller is received, the TV 1000 may control an illumination sensor included in the TV 1000 to sense the peripheral illumination of the TV 1000. Also, when an illumination sensor is included in the remote controller, the TV 1000 may receive the illumination information from the remote controller.

Also, when the illumination is equal to or greater than a threshold value, the TV may perform image processing on the original image 100 to display the image 130 in which an outline of an object in the original image 100 is emphasized. Also, as the illumination is increased, the TV may perform image processing on the original image 100 such that a thickness of the outline of the object is increased.

Referring to FIG. 11, the device 1000 may include a mobile device. The mobile device 1000 may provide a button 1105 for changing an image according to a peripheral illumination. For example, the mobile device 1000 may display the button 1105 for changing the image according to the peripheral illumination, on a brief setting menu window of the mobile device 100. When a user's input for toggling the button 1105 is received, the mobile device 1000 may control the illumination sensor 1495 to sense the peripheral illumination, and when the sensed illumination is equal to or greater than a threshold value, the mobile device 1000 may perform image processing on the original image 100 to display the image 130 in which an outline of an object in the original image 100 is emphasized. Also, as the illumination is higher, the mobile device 1000 may perform image processing on the original image 100 such that a thickness of the outline of the object is thicker.

Figure 12:
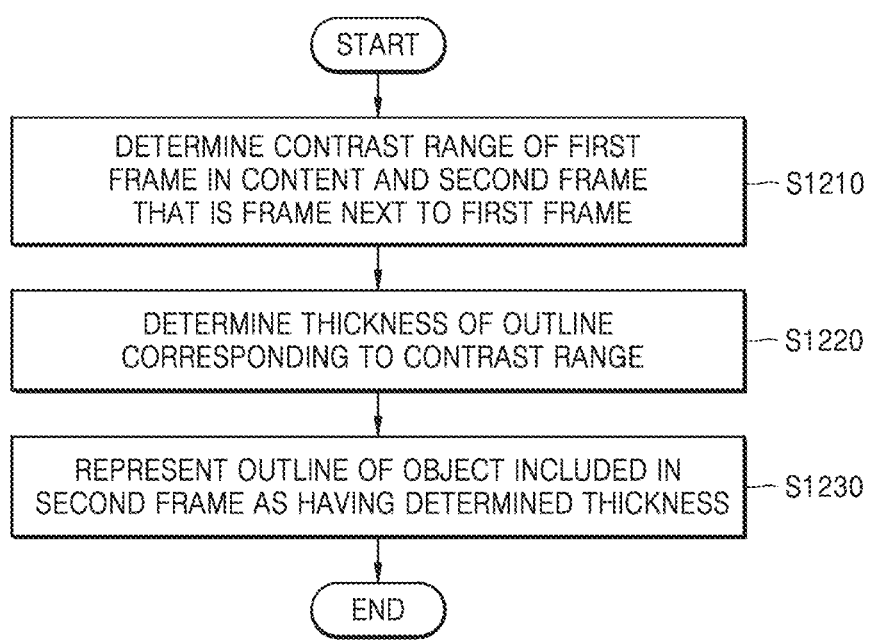
FIG. 12 is a flowchart of a method, performed by a device, of changing an image based on a contrast range between sequential images, according to one or more embodiments.

FIG. 12 is a flowchart of a method, performed by the device 1000, of changing an image based on a contrast range between sequential images, according to one or more embodiments.

In operation S1210, the device 1000 may determine a contrast range of a first frame in content and a second frame, which is a frame next to the first frame.

The contrast range may denote a difference between a sum of brightness values of pixels in the first frame and a sum of brightness values of pixels in the second frame. Also, the contrast range may denote a difference between an average of the brightness values of the pixels in the first frame and an average of the brightness values of the pixels in the second frame.

When a frame having a low brightness is sequentially displayed after a frame having a high brightness, a recognition rate of the frame having the low brightness may be decreased.

In operation S1220, the device 1000 may determine a thickness of an outline corresponding to the contrast range.

The device 1000 may determine the thickness of the outline corresponding to the contrast range, when the determined contrast range is equal to or greater than a predetermined level. Also, the device 1000 may increase the thickness of the outline as the contrast range is increased.

In operation S1230, the device 1000 may indicate an outline of an object included in the second frame as having the determined thickness.

The device 1000 may display an image in which the outline of the object in the second frame is indicated as having the determined thickness, by applying an image filter to the second frame. The image filter may include an edge enhancement filter emphasizing an outline in an image. Also, the image filter may include a filter for increasing a brightness of areas of the image, except for the outline. For example, the image filter may include an adaptive threshold filter, but it is not limited thereto.

FIG. 12 illustrates the embodiment, according to which the thickness of the outline is determined according to the contrast range, and the outline in the second frame is displayed as having the determined thickness. However, according to an embodiment, when the contrast range is equal to or greater than a predetermined level, a predetermined edge enhancement filter may be applied to the second frame regardless of the contrast range.

Figure 13:
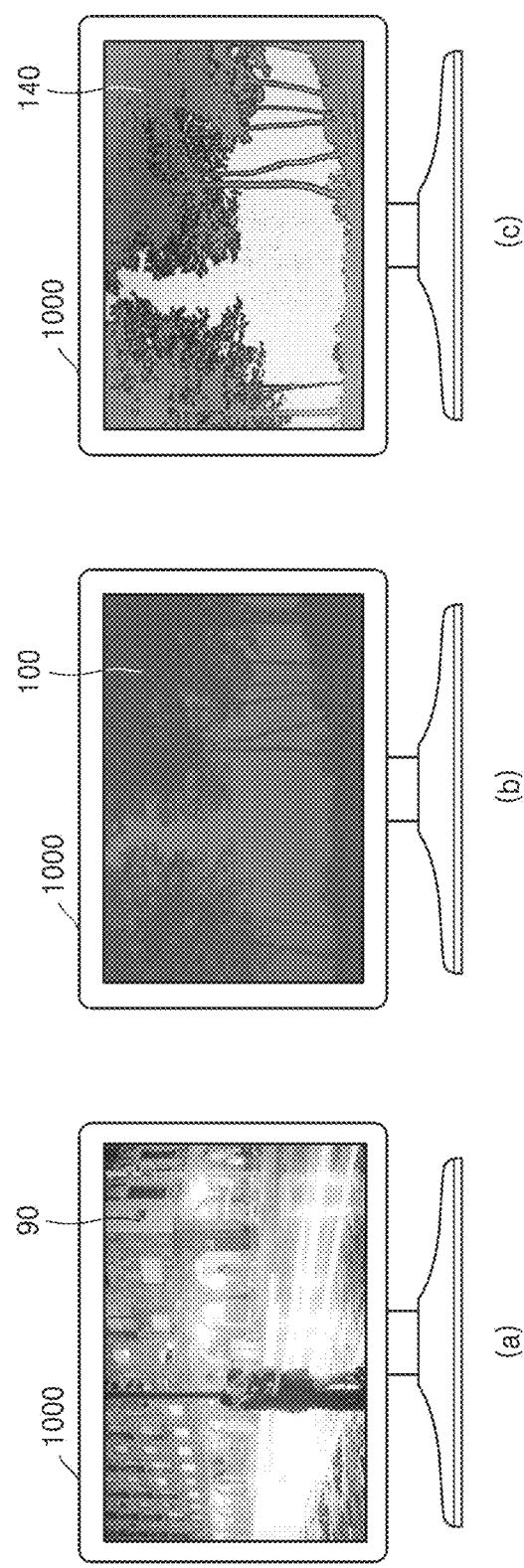
FIG. 13 illustrates a method, performed by a device, of changing an image based on a contrast range between sequential images, according to one or more embodiments.

FIG. 13 illustrates a method, performed by the device 1000, of changing an image based on a contrast range between sequential images, according to one or more embodiments.

Referring to (a) and (b) of FIG. 13, the device 1000 may display a video frame. The image illustrated in (a) of FIG. 13 may be a first frame 90 and the image illustrated in (b) of FIG. 13 may be a second frame 100, which is a frame next to the first frame 90.

The device 1000 may determine a brightness value of the first frame 90 and a brightness value of the second frame 100.

Referring to (c) of FIG. 13, when a difference between the brightness value of the first frame 90 and the brightness value of the second frame 100 is equal to or greater than a reference level, the device 1000 may apply an adaptive threshold filter to the second frame 100 to generate an image 140 in which an outline of an object in the second frame 100 is emphasized. Also, the device 1000 may display the image 140 on which image processing is performed, rather than the second frame 100, at a time at which the second frame 100 is to be displayed, with reference to a time stamp value of the second frame 100.

The device 1000 may use the adaptive threshold filter to represent the outline of the object in the image as a dark and thick outline, and may generally increase the brightness value of pixels, except for the outline, in order to vividly display the outline of the object.

Figure 14:
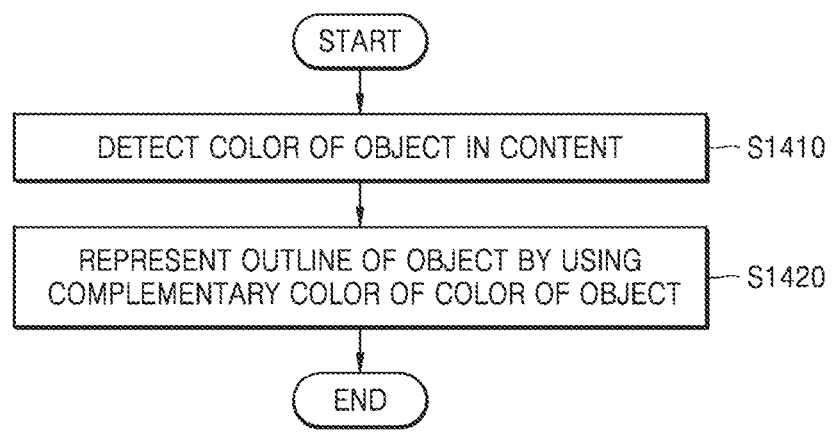
FIG. 14 is a flowchart of a method, performed by a device, of generating an image emphasizing an outline of an object, based on a color of the object.

FIG. 14 is a flowchart of a method, performed by the device 1000, of generating an image emphasizing an outline of an object based on a color of the object.

In operation S1410, the device 1000 may detect the color of the object in content.

The device 1000 may detect a plurality of objects in the image and determine an area corresponding to each of the plurality of objects. For example, the device 1000 may determine areas indicating a similar color as an area of one object. Also, for example, the device 1000 may segment the image into areas of a plurality of objects by using a vision algorithm.

The device 1000 may detect a color of each object from each area corresponding to the object. For example, the device 1000 may determine a color most frequently occurring in the area of the object as a color of the object. Also, for example, the device 1000 may determine an average RGB value of pixels in the area of the object as the color of the object. Also, for example, the device 1000 may determine a color of an area adjacent to an outline in the object as the color of the object.

In operation S1420, the device 1000 may represent the outline of the object by using a complementary color of the color of the object.

The device 1000 may represent the outline of the object by using the complementary color of the color of the object, regardless of a color of a background of the object. Also, the device 1000 may represent the outline of the object by using the complementary color of the color of the object only when it is determined that the color of the background of the object is similar to the color of the object. The device 1000 may determine colors in a hue circle arrangement, the colors being adjacent to each other or not being apart from each other by a certain distance equal to or greater than a reference distance, as similar colors.

Also, when a peripheral illumination of the device 1000 is equal to or greater than a reference value, the device 1000 may change the original image such that the outline of the object is represented by using the complementary color of a color of a line of the object.

Also, the device 1000 may consider user's color contrast sensitivity. For example, the device 1000 may store a set of colors that are difficult to be identified by a user. For example, the device 1000 may provide a menu to test the color contrast sensitivity, and when the device 1000 receives a user's input for measuring the color contrast sensitivity, the device 1000 may determine and store the user's color contrast sensitivity. When a color of the object and a color of the background of the object are colors difficult to be distinguished by a user, the device 1000 may indicate the outline of the object by using a complementary color of the color of the object.

Figure 15:
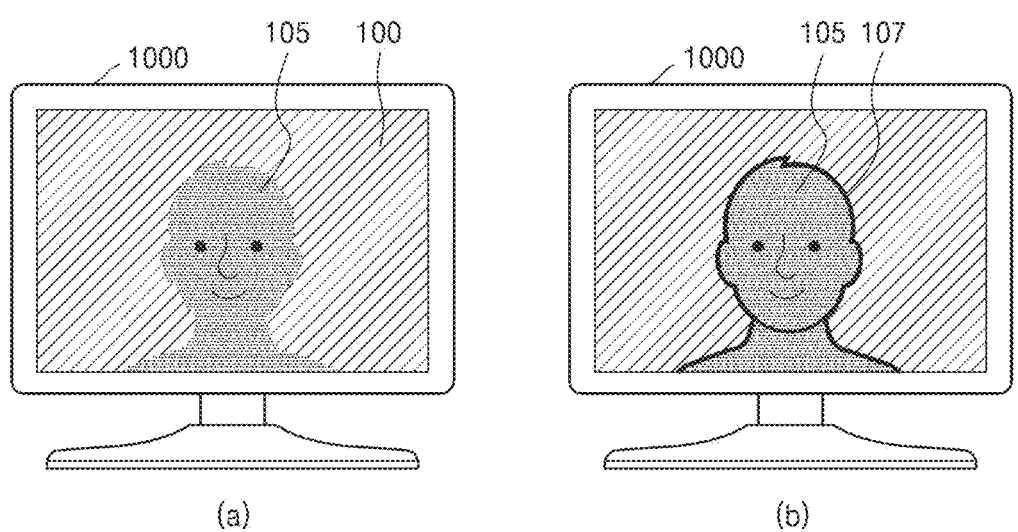
FIG. 15 illustrates a method, performed by a device, of changing a color of an outline of an object based on a color of the object and a color of a background of the object.

FIG. 15 illustrates a method, performed by the device 1000, of changing a color of an outline of an object based on a color of the object and a color of a background of the object.

Referring to (a) of FIG. 15, a user may not be able to distinguish a color of an object 105 indicated in the original image 100 to be displayed, from a color of a background of the object 105.

For example, in the case of a user having low color contrast sensitivity with respect to the red color and the orange color, when the color of the object 105 is red and the color of the background of the object 105 is orange, it may be difficult to recognize an outline of the object.

Referring to (b) of FIG. 15, the device 1000 may determine an area of the object 105 in the original image 100 and an area of a background of the object 105, and when a color of the object 105 is similar to a color of the background of the object 105, the device 1000 may change the original image 100 such that an outline 107 of the object 105 is indicated by using a complementary color of a color of a line of the object.

Also, according to another embodiment, when a color of the object 105 and a color of the background of the object 105 correspond to a set of colors, for which a user's contrast sensitivity is equal to or less than a reference value, the device 1000 may change the original image 100 such that the outline 107 of the object is indicated by using a complementary color of a color of a line of the object.

By doing so, when it is difficult to distinguish the colors of the background and the object in the image, because the colors correspond to colors which are hard to be distinguished by a user, the device 1000 may represent the outline of the object by using the complementary color of the color of the object, in order to remove the phenomenon in which the background and the object are hardly distinguished.

Figure 16:
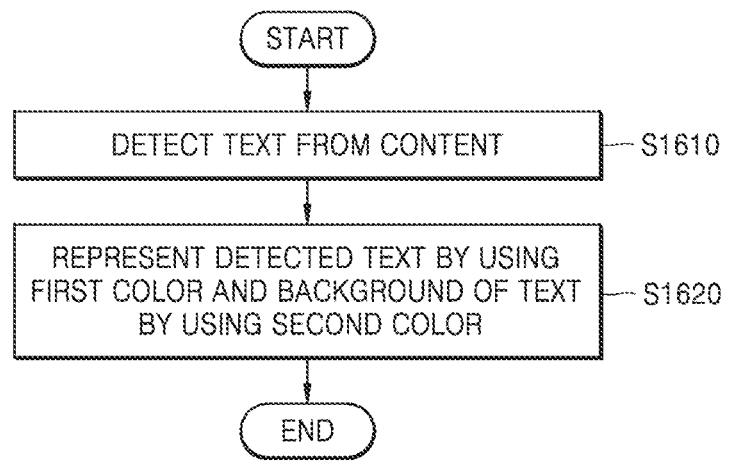
FIG. 16 is a flowchart of a method, performed by a device, of increasing a recognition rate of text in an image, according to one or more embodiments.

FIG. 16 is a flowchart of a method, performed by the device 1000, of increasing a recognition rate of text in an image, according to one or more embodiments.

In operation S1610, the device 1000 may detect text from content.

The device 1000 may detect a location of a pixel indicating the text. Also, when there is a background area of the text for emphasizing the text in the image, the device 1000 may detect a location of the background area of the text. For example, when there is a piece of text "MIL" in the image, the device 1000 may detect a location of a pixel indicating the piece of text "MIL" and a location of a pixel indicating a background area of the piece of text "MIL."

Also, the device 1000 may recognize text indicated by an image. For example, the device 1000 may recognize that the recognized piece of text indicates the English letters "M," "I," and "L."

In operation S1610, the device 1000 may represent the detected text by using a first color and the background of the text by using a second color.

The device 1000 may represent the detected text by using the white color and the background area of the text by using the black color. Since the white color and the black color have the highest brightness difference, and the text is represented by using the white color having the highest brightness and the background area is represented by using the black color having the lowest brightness, even a user having a low sensitivity may easily recognize the text.

According to an embodiment, the text may be represented by using the black color and the background of the text may be represented by using the white color, or the text may be represented by using the white color and the background of the text may be represented by using a grey color. The text and the background of the text may be represented via the combination of colors having a brightness difference equal to or greater than a reference value.

The device 1000 may perform image processing of changing a color of the pixel indicating the text as a first color and a color of the pixel of the background area of the text as a second color. Also, according to an embodiment, when there is no background area of the text for emphasizing the text, the device 1000 may determine the background area of the text based on a size of the text and may perform image processing of changing a color of a pixel of the determined background area as the second color. Also, according to an embodiment, the device 1000 may generate a text emphasizing image in which recognized text is represented by using the white color in a background of the black color, and may perform image processing of representing the generated text emphasizing image in a background area of text in the original image.

Also, according to an embodiment, the device 1000 may apply a filter to emphasize outlines, to areas except for an area for the text and the background area in the image.

Figure 17:
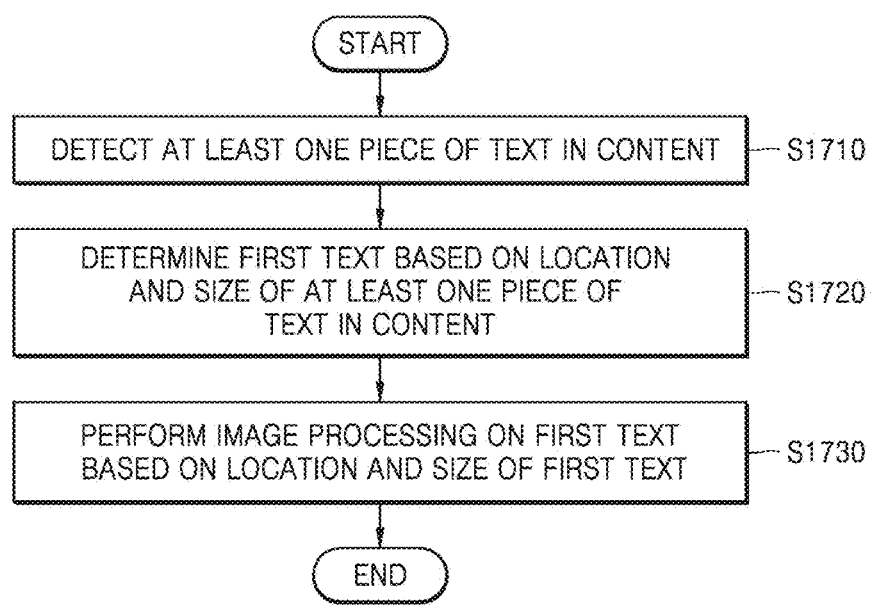
FIG. 17 is a flowchart of a method, performed by a device, of selecting text to be emphasized based on a location and a size of the text, according to one or more embodiments.

FIG. 17 is a flowchart of a method, performed by the device 1000, of selecting text to be emphasized based on a location and a size of the text, according to one or more embodiments.

In operation S1710, the device 1000 may detect at least one piece of text in content.

The device 1000 may detect the at least one piece of text from among a plurality of pieces of text in an image. Operation S1710 may be described by referring to operation S1610 of FIG. 16.

In operation S1720, the device 1000 may determine first text based on a location and a size of the at least one piece of text in the content.

The device 1000 may determine text located at the bottom of an image from the at least one piece of text as the first text to be emphasized. Important text in the broadcasting content or the movie content is located at the bottom of an image. Thus, the device 1000 may determine the text located at a predetermined bottom area from the recognized at least one piece of text as the first text to be emphasized. Also, scores are located at the top of an image in the sports content, and thus, the device 1000 may determine text located at the top of an image from the at least one piece of text as the first text to be emphasized.

Also, since important text is represented as having an increased size in the content, the device 1000 may determine text having a size equal to or greater than a predetermined size from the at least one piece of text as the first text to be emphasized.

In operation S1730, the device 1000 may perform image processing on the first text based on the location and the size of the first text.

For example, when the first text is located at the bottom of the image, the device 1000 may represent the first text by using a first color and a background of the first text by using a second color.

However, an important object to be indicated by an image is located at the center of the image, and thus, when the first text is located at the center of the image, and the first text is represented by using the first color and the background of the first text is represented by using the second color, the important part of the original image may become clouded.

Thus, when the first text is located at the center of the image, the device 1000 may change the color of the first text as a color having a high brightness, may change the color of the first text as a complementary color of a color of a background area of the first text, or may apply an edge enhancement filter to the first text to emphasize an outline of the first text.

Also, according to an embodiment, text, except for the first text, from the recognized at least one piece of text, may have a low importance, and thus, image processing for emphasizing the text may not be performed, and the text may be relatively dimly represented by using a blurring filter.

Figure 18:
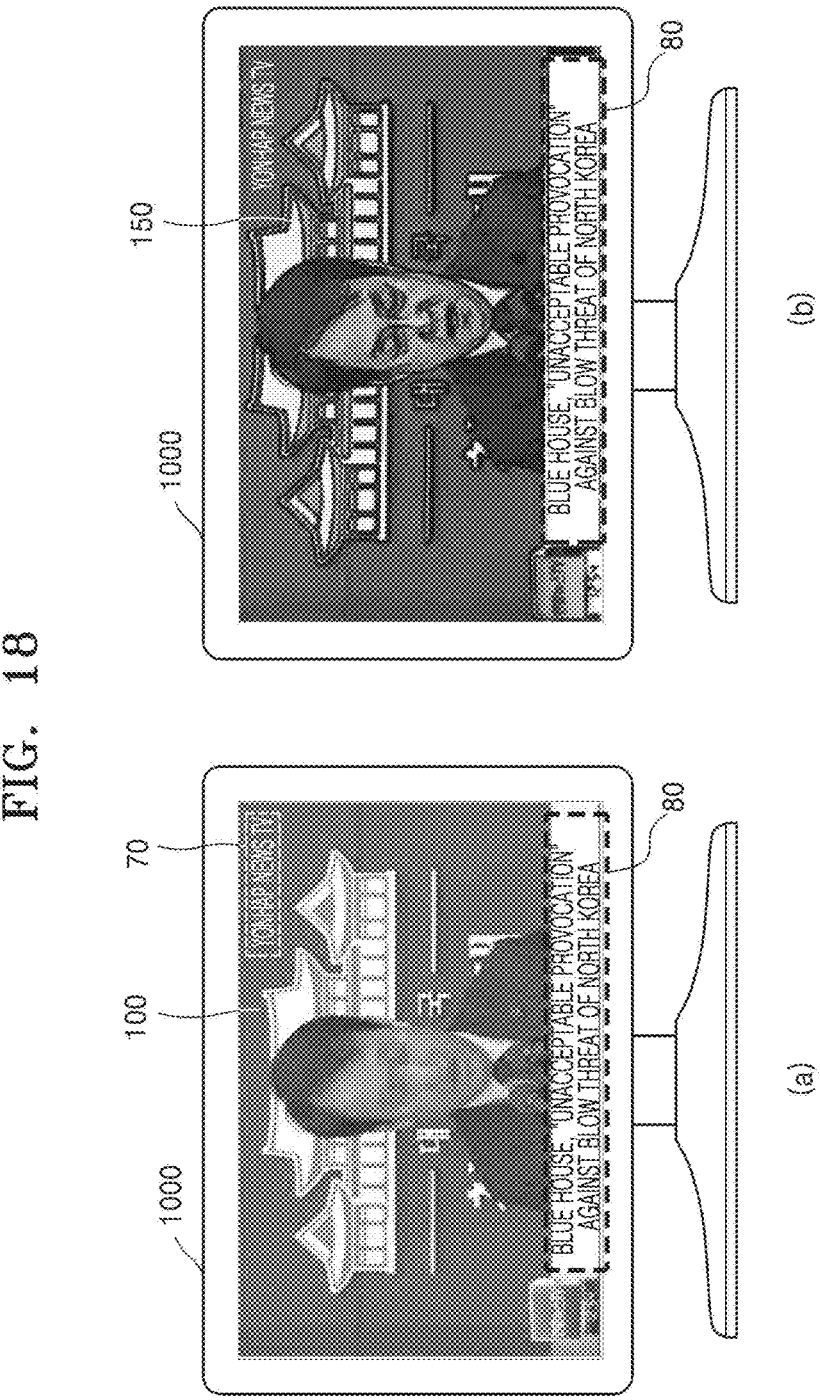
FIGS. 18 and 19 illustrate a method, performed by a device, of increasing a recognition rate of text in an image.
Figure 19:
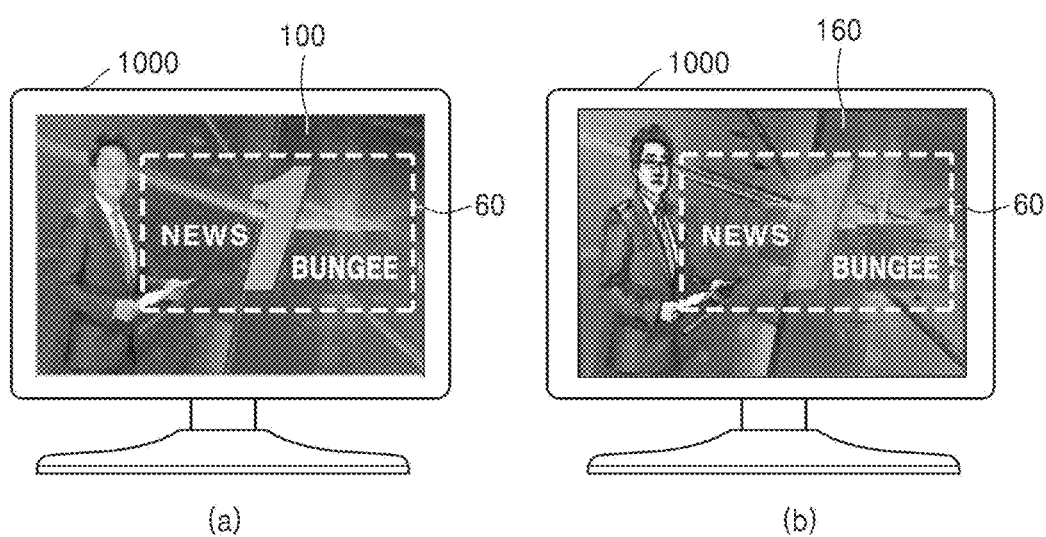

FIGS. 18 and 19 illustrate a method, performed by the device 1000, of increasing a recognition rate of text in an image.

Referring to (a) and (b) of FIG. 18, the device 1000 may detect text in content and represent the detected text by using the white color and a background of the text by using the black color.

Referring to (a) of FIG. 18, the device 1000 may detect first text 70 in the original image 100. Also, the device 1000 may detect second text 80 and a background area of the second text 80.

The device 1000 may determine a location of the first text 70 as a right upper end of an image and a location of the second text 80 as a lower end of the image. Also, the device 1000 may determine that a size of the first text 70 is smaller than a reference size and a size of the second text 80 is greater than the reference size.

Referring to (b) of FIG. 18, the device 1000 may determine the second text 80 located at the lower end of the image and having the size greater than the reference size as text to be emphasized.

The device 1000 may represent an image indicating the second text 80 by using the white color and a background area of the second text 80 by using the black color at the background area of the second text 80, thereby increasing a recognition rate of the second text 80. In this case, the device 1000 may perform image processing of changing a color of a pixel indicating the second text 80 as the white color and a color of a pixel of the background area of the second text 80 as the black color.

Also, the device 1000 may apply an adaptive threshold filter to areas except for the second text 80 and the background area of the second text 80, in order to display an adaptive threshold filter image 150 in which an outline of an object in the original image 100 is emphasized.

Referring to (a) and (b) of FIG. 19, the device 1000 may perform different image processing operations according to locations of detected text.

Referring to (a) of FIG. 19, the device 1000 may detect text 60 located at the center of an image. Referring to (b) of FIG. 19, the device 1000 may determine that the text 60 is located at the center of the image, may apply an edge enhancement filter to an area of the text 60 in order not to blur the important part located at the center of an original image, and may generate an adaptive threshold filter image 160 by applying an adaptive threshold filter to areas except for the text 60.

Figure 20:
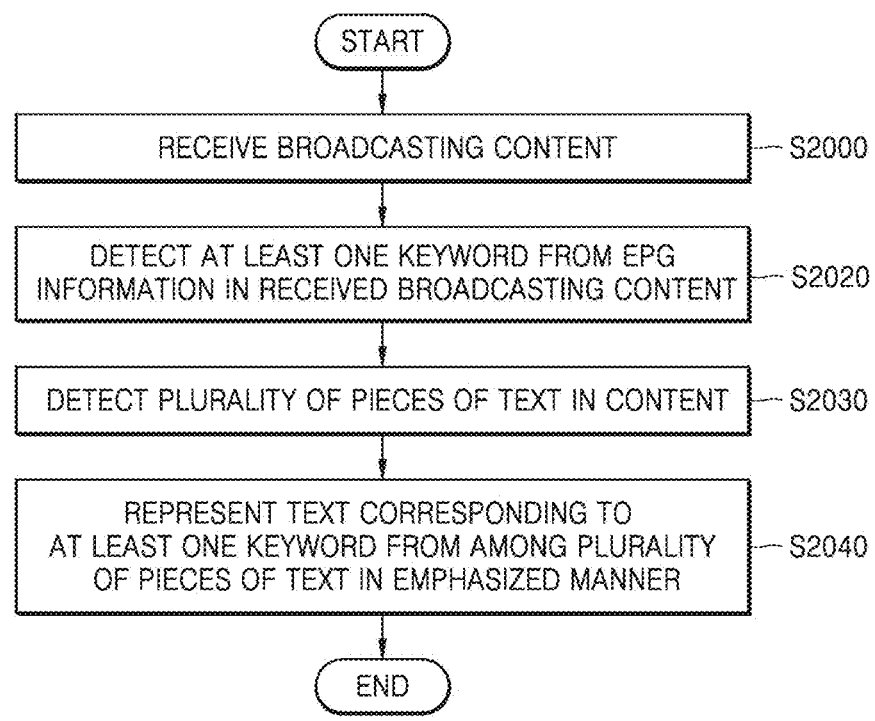
FIG. 20 is a flowchart of a method, performed by a device, of selecting text to be emphasized based on electronic program guide (EPG) information.

FIG. 20 is a flowchart of a method, performed by the device 1000, of selecting text to be emphasized based on electronic program guide (EPG) information.

In operation S2000, the device 1000 may receive broadcasting content.

The device 1000 may receive the broadcasting content from an external server. Also, the device 1000 may receive the broadcasting content from a broadcasting station.

In operation S2020, the device 1000 may detect at least one keyword from the EPG information in the received broadcasting content.

The broadcasting content may include an audio signal, a video signal, and the EPG information. The EPG information may include information about a program title, a program time, program contents, casts, genre, etc.

In operation S2030, the device 1000 may detect a plurality of pieces of text from the content.

Operation S2030 may be described by referring to operation S1610 of FIG. 16.

In operation S2040, the device 1000 may represent text corresponding to the at least one keyword, from among the plurality of pieces of text, by emphasizing the text.

Information corresponding to the EPG information from the detected plurality of pieces of text is the important information, and thus, the device 1000 may determine the text corresponding to the at least one keyword from among the plurality of pieces of text as the text to be emphasized.

Figure 21:
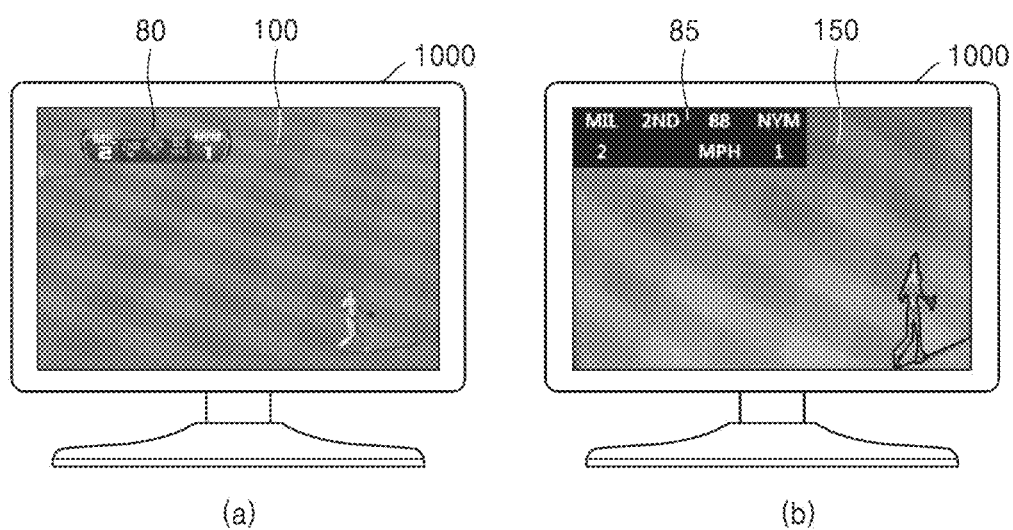
FIG. 21 illustrates a method, performed by a device, of selecting text to be emphasized based on EPG information and performing image processing on the selected text, according to one or more embodiments.

FIG. 21 illustrates a method, performed by the device 1000, of selecting text to be emphasized based on EPG information and performing image processing on the selected text, according to one or more embodiments.

Referring to (a) of FIG. 21, the device 1000 may display a baseball broadcasting program. The device 1000 may detect a plurality of pieces of text from the original image 100. For example, the device 1000 may detect "MIL," "2," "2ND," "88 MPH," "NYM," and "1" from the original image 100 and determine English letters or numbers corresponding to the detected plurality of pieces of text.

Also, the device 1000 may determine a background area 80 of the text. For example, the device 1000 may determine areas indicating a similar color from areas adjacent to the text as the background area 80 of the text. Also, the device 1000 may determine the background area 80 of the text by determining a silhouette of an area including the text by applying an edge detection filter to areas around the text.

The device 1000 may detect at least one keyword by parsing the EPG information about a program that is displayed. For example, when the EPG information includes "MIL VS NYM" as a title of the program, and includes "sports" and "baseball broadcasting" as a genre of the program, the device 1000 may determine "MIL VS NYM," "sports," and "baseball broadcasting" as the keywords.

Referring to (b) of FIG. 21, the device 1000 may determine "MIL" and "NYM" corresponding to the keywords, from among the detected pieces of text, as the text to be emphasized. Also, the device 1000 may determine pieces of text adjacent to the text to be emphasized as a text group and may determine the text group including the text to be emphasized as the text to be emphasized. In this case, the device 1000 may determine all of "MIL," "2," "2ND," "88 MPH," "NYM," and "1" as the text to be emphasized.

Also, the device 1000 may determine the text to be emphasized based on genre information of the program. For example, when the genre is sports or home shopping, scores or prices are important information, and thus, numbers may be determined as the text to be emphasized.

The device 1000 may generate a text emphasizing image 85 in which detected texts are represented as having the white color in the background of the black color. In this case, the device 1000 may increase a size of the text to be displayed to be greater than a size of the original text, according to an illumination or a user's contrast sensitivity. Also, the device 1000 may increase a thickness of the text to be displayed to be greater than a thickness of the original text, according to an illumination or a user's contrast sensitivity.

The device 1000 may generate an image 150 to be displayed, by performing image processing on the original image 100 such that the text emphasizing image 85 is represented. In this case, the device 1000 may generate the image 150 to be displayed, by applying an image filter to areas except for an area to which the text emphasis image is applied, wherein the image filter is applied to emphasize an outline of an object.

Figure 22:
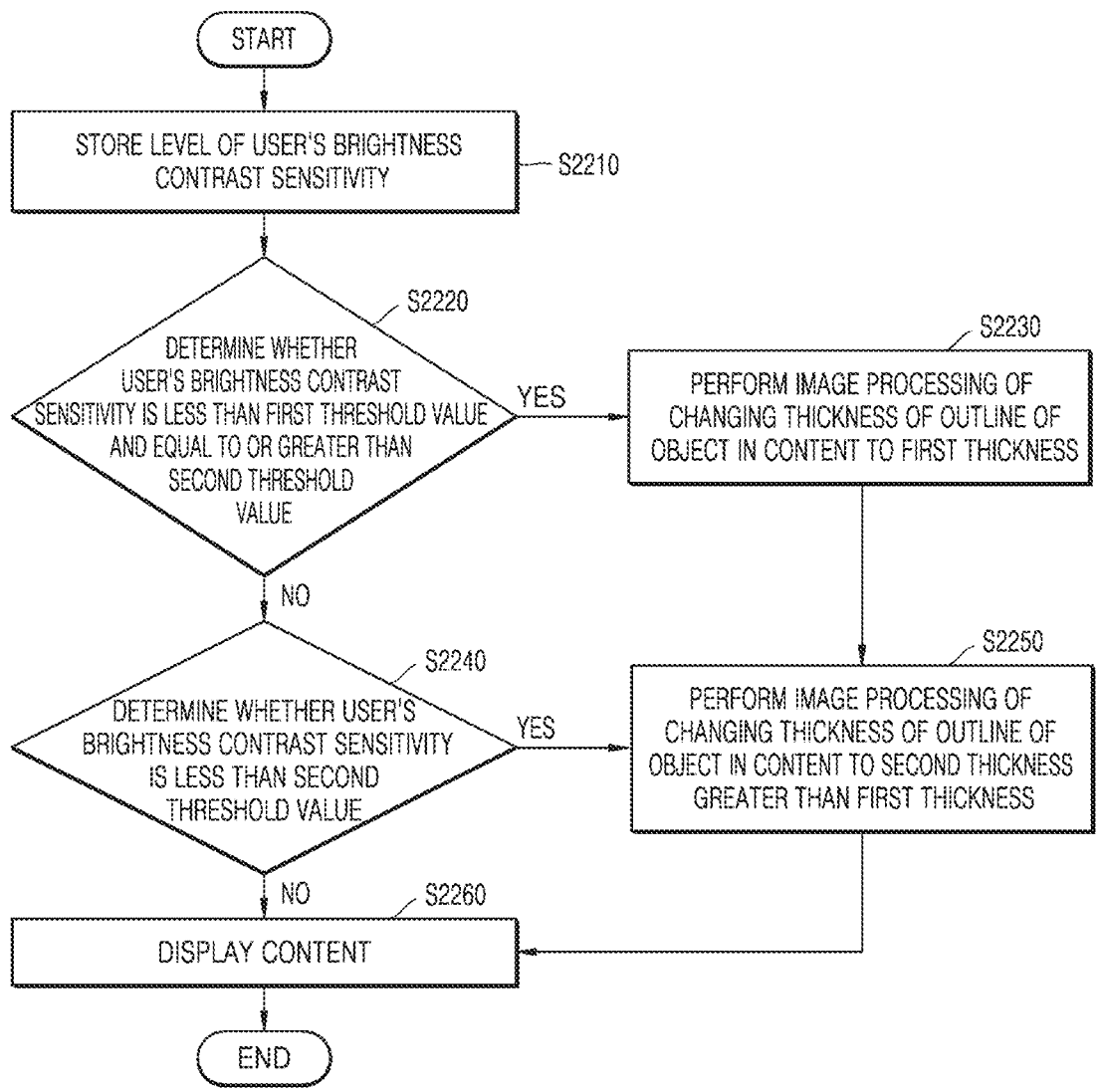
FIG. 22 is a flowchart of a method, performed by a device, of adjusting a thickness of an outline of an object in an image, according to a user's brightness contrast sensitivity, according to one or more embodiments.

FIG. 22 is a flowchart of a method, performed by the device 1000, of adjusting a thickness of an outline of an object in an image, according to a user's brightness contrast sensitivity, according to one or more embodiments.

In operation S2210, the device 1000 may store a level of a user's brightness contrast sensitivity.

For example, the device 1000 may provide a menu for receiving a user's input for setting the level of the user's brightness contrast sensitivity. Also, the device 1000 may provide a button for receiving a user's input for setting the level of the user's brightness contrast sensitivity.

In operation S2220, the device 1000 may determine whether the user's brightness contrast sensitivity is less than a first threshold value and equal to or greater than a second threshold value.

When the user's brightness contrast sensitivity is less than the first threshold value and equal to or greater than the second threshold value in operation S2220, the device 1000 may perform image processing of changing a thickness of an outline of an object in content as a first thickness, in operation S2230. Operation S2230 may be described by referring to operation S630 of FIG. 6.

When the user's brightness contrast sensitivity is not less than the first threshold value and equal to or greater than the second threshold value in operation S2220, the device 1000 may determine whether the user's brightness contrast sensitivity is less than a second threshold value in operation S2240.

When the user's brightness contrast sensitivity is less than the second threshold value in operation S2240, the device 1000 may perform image processing of changing a thickness of an outline of the object in the content as a second thickness that is greater than the first thickness. Operation S2240 may be described by referring to operation S630 of FIG. 6.

When the user's brightness contrast sensitivity is not less than the second threshold value in operation S2240, the device 1000 may display the content. That is, when the user's brightness contrast sensitivity is less than the first threshold value, the device 1000 may display the content on which the image processing is performed, and when the user's brightness contrast sensitivity is equal to or greater than the first threshold value, the device 1000 may directly display the original image.

Figure 23:
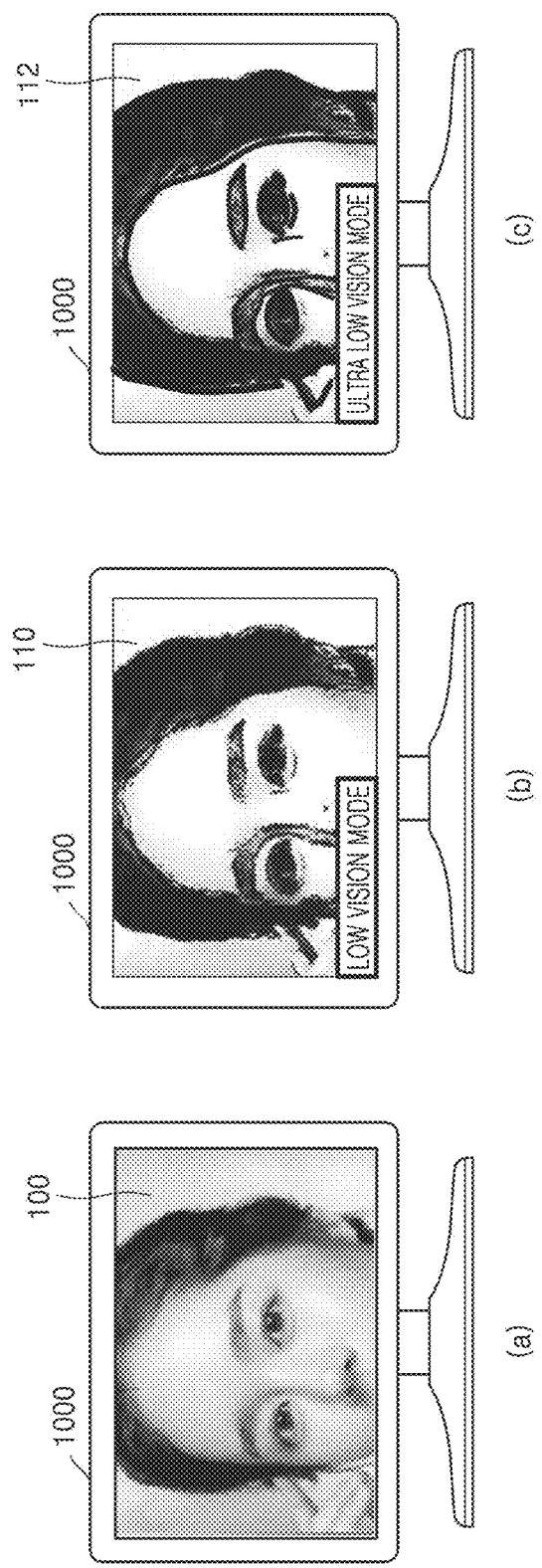
FIG. 23 illustrates a method, performed by a device, of adjusting a thickness of an outline of an object in an image, according to a user's brightness contrast sensitivity, according to one or more embodiments.

FIG. 23 illustrates a method, performed by the device 1000, of adjusting a thickness of an outline of an object in an image, according to a user's brightness contrast sensitivity, according to one or more embodiments.

Referring to (a) of FIG. 23, when the user's brightness contrast sensitivity is equal to or greater than the first threshold value, the device 1000 may display the original image 100.

Referring to (b) of FIG. 23, when the user's brightness contrast sensitivity is less than the first threshold value and equal to or greater than the second threshold value, the device 1000 may display the outline of the object in the original image 100 as having a first thickness.

Referring to (c) of FIG. 23, when the user's brightness contrast sensitivity is less than the second threshold value, the device 1000 may display the outline of the object in the original image 100 as having a second thickness that is greater than the first thickness.

Figure 24:
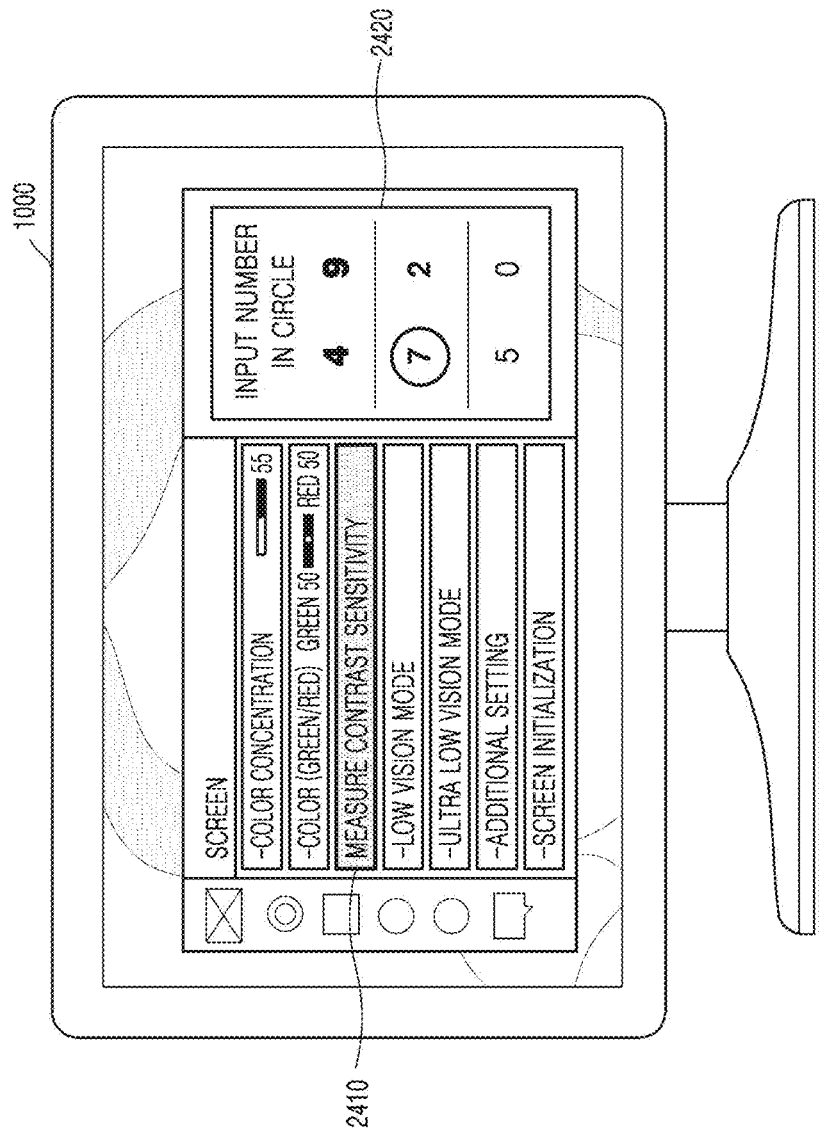
FIG. 24 illustrates a method, performed by a device, of providing a user interface for receiving a user's brightness contrast sensitivity, according to one or more embodiments.

FIG. 24 illustrates a method, performed by the device 1000, of providing a user interface for receiving a user's brightness contrast sensitivity, according to one or more embodiments.

Referring to FIG. 24, the device 1000 may provide a menu 2410 for receiving the user's brightness contrast sensitivity. When the device 1000 receives a user's input for selecting the menu 2410, the device 1000 may display a brightness contrast sensitivity inspection label 2420. When a user's input for inputting text designated in the brightness contrast sensitivity inspection label 2420 by using a remote controller, the device 1000 may determine the user's brightness contrast sensitivity.

Figure 25:
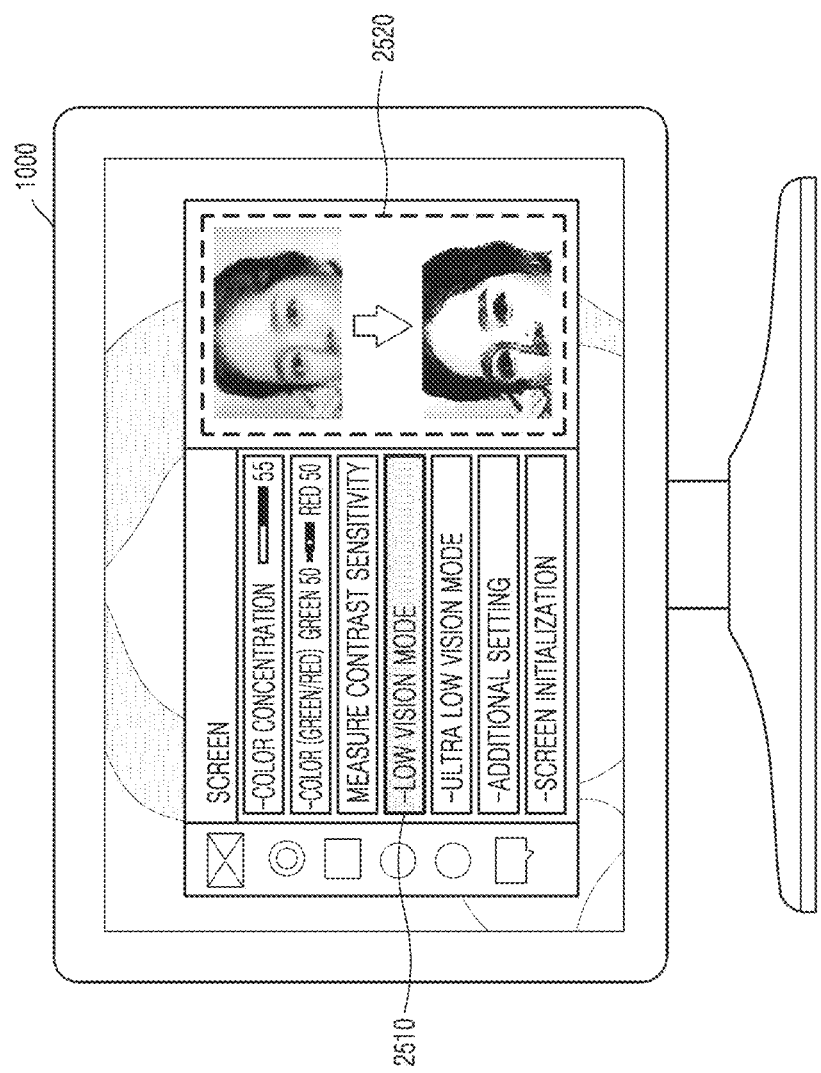
FIGS. 25 and 26 illustrate a method, performed by a device, of providing a user interface for receiving a user's input for setting a display mode, according to one or more embodiments.
Figure 26:
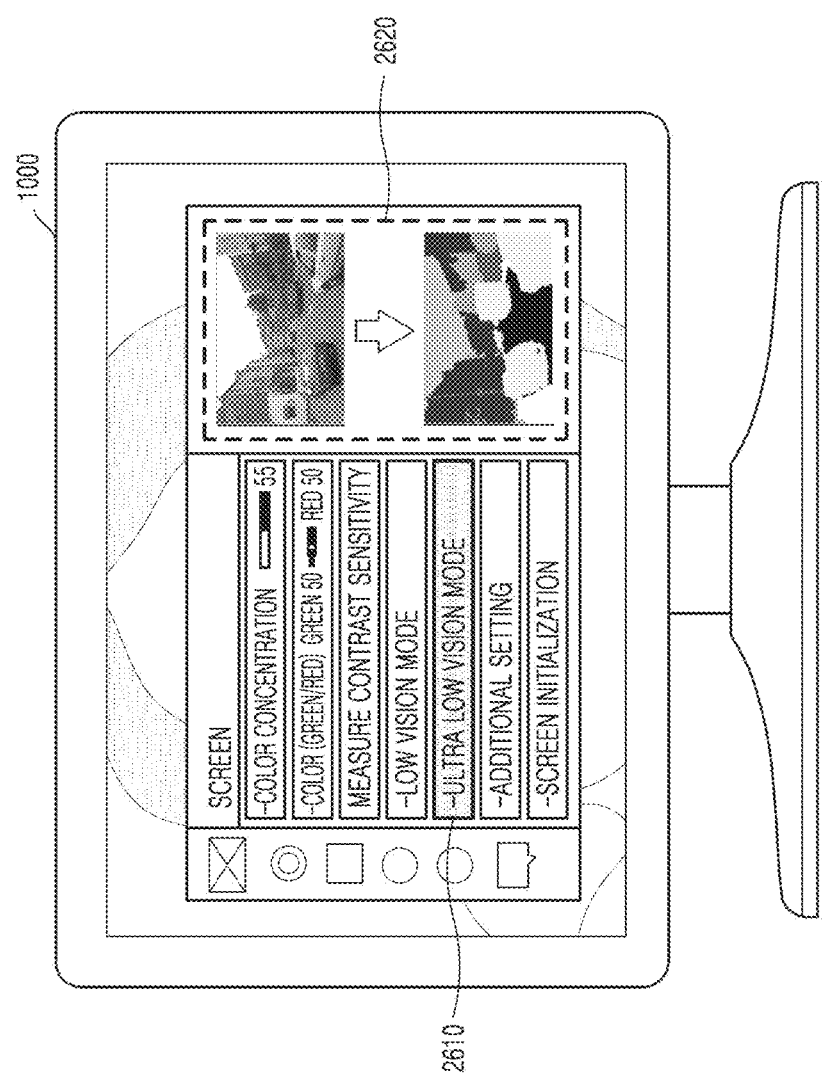

FIGS. 25 and 26 illustrate a method, performed by the device 1000, of providing a user interface for receiving a user's input for setting a display mode, according to one or more embodiments.

Referring to FIG. 25, the device 1000 may receive a user's input for setting a first mode for increasing a recognition rate of an object in an image.

The first mode may be a mode in which an outline of an object is displayed as having an increased thickness by using an adaptive threshold filter in an original image. The device 1000 may display a menu 2510 for setting the first mode. The first mode may be displayed as a "low vision mode," and may also be displayed as a "high illumination mode." Also, when the device 1000 receives a user's input for selecting the first mode, the device 1000 may display a reference image 2520 indicating image processing applied in the first mode. The reference image 2520 may include the original image and an image obtained by performing image processing on the original image in the first mode.

Referring to FIG. 26, the device 1000 may receive a user's input for setting a second mode for increasing a recognition rate of an object in an image.

The second mode may be a mode in which the object in the original image is represented by using a brightness contrast or a mode in which along with the brightness contrast, an outline of the object is represented. The device 1000 may display a menu 2610 for setting the second mode. The second mode may be displayed as an "ultra low vision mode" or an "ultra high illumination mode." Also, when the device 1000 receives a user's input for selecting the second mode, the device 1000 may display a reference image 2620 indicating image processing applied in the second mode.

Figure 27:
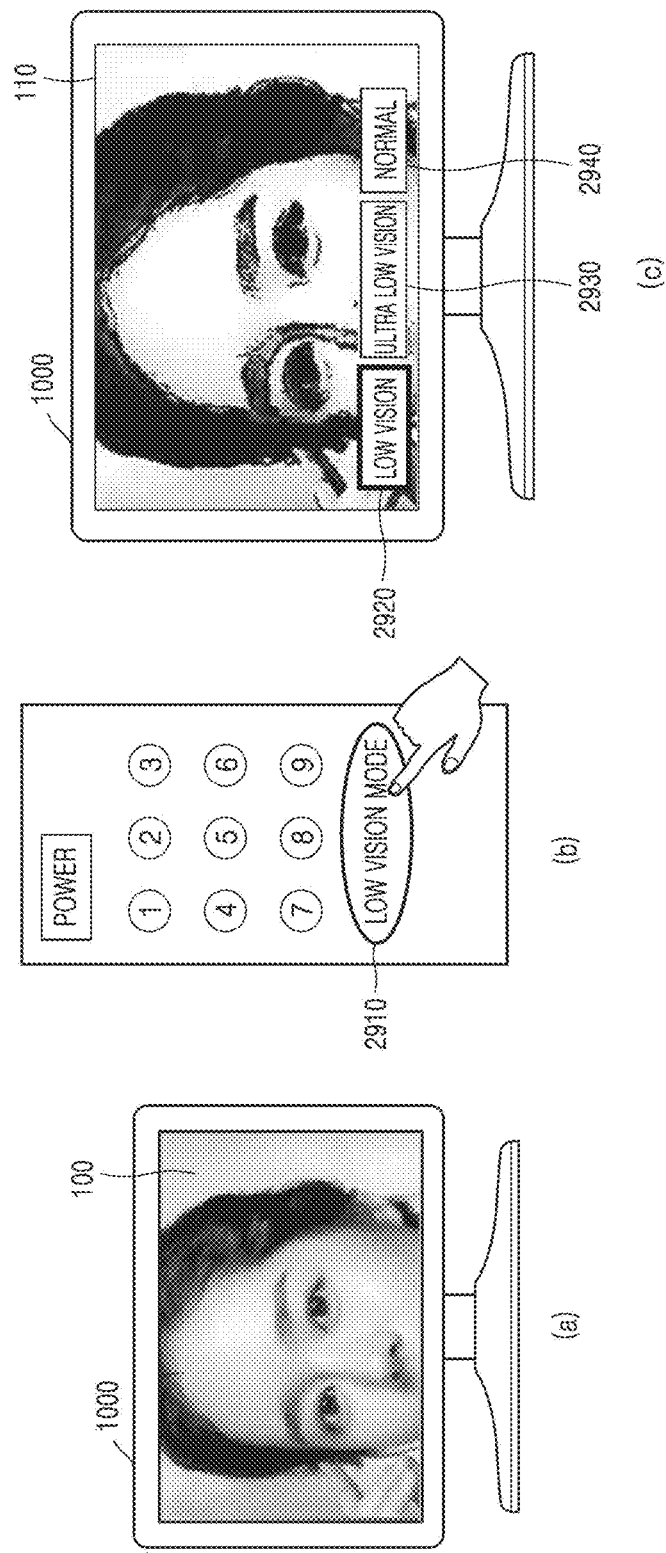
FIG. 27 is a flowchart of a method, performed by a device, of selecting an image processing method according to a user's brightness contrast sensitivity, according to one or more embodiments.

FIG. 27 is a flowchart of a method, performed by the device 1000, of selecting an image processing method according to a user's brightness contrast sensitivity, according to one or more embodiments.

In operation S2710, the device 1000 may store a level of the user's brightness contrast sensitivity. Operation S2710 may be described by referring to operation S2210 of FIG. 22.

In operation S2720, the device 1000 may determine whether the user's brightness contrast sensitivity is less than a first threshold value and equal to or greater than a second threshold value. When the user's brightness contrast sensitivity is less than the first threshold value and equal to or greater than the second threshold value in operation S2720, the device 1000 may perform image processing of applying an adaptive threshold filter to an image in content in operation S2730.

When the user's brightness contrast sensitivity is not less than the first threshold value and equal to or greater than the second threshold value in operation S2720, the device 1000 may determine whether the user's brightness contrast sensitivity is less than a second threshold value and equal to or greater than a third threshold value in operation S2740.

When the user's brightness contrast sensitivity is less than the second threshold value and equal to or greater than the third threshold value in operation S2740, the device 1000 may perform image processing of representing the object in the content by using a brightness contrast and indicating an outline of the object in operation S2750.

When the user's brightness contrast sensitivity is not less than the second threshold value and equal to or greater than the third threshold value in operation S2740, the device 1000 may determine whether the user's brightness contrast sensitivity is less than a third threshold value in operation S2760.

When the user's brightness contrast sensitivity is less than the third threshold value in operation S2760, the device 1000 may perform image processing of representing the object in the content by using the brightness contrast in operation S2770. When the user's brightness contrast sensitivity is not less than the third threshold value in operation S2760, the device 1000 may display the content in operation S2780.

Figure 28:
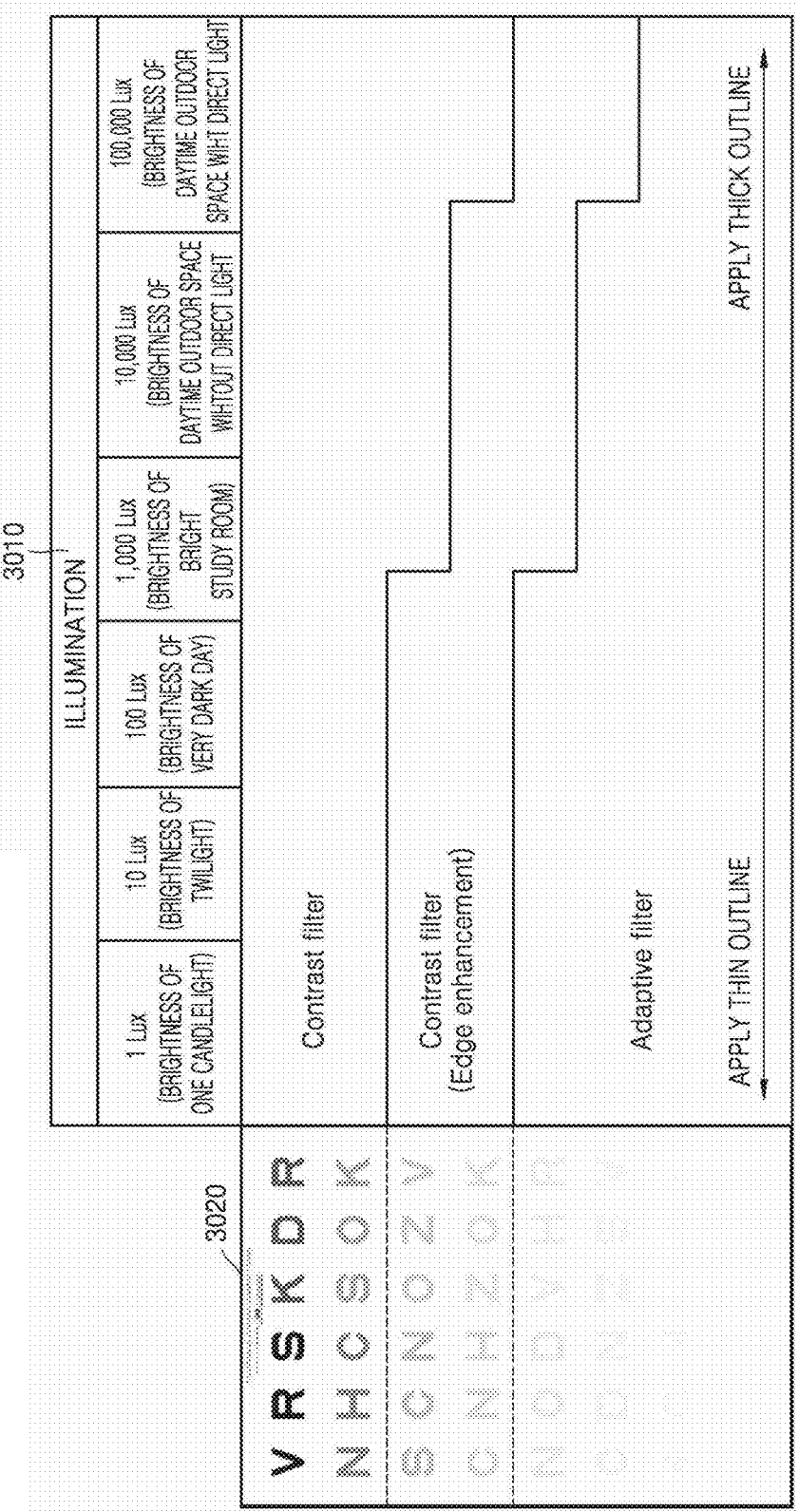
FIG. 28 illustrates a method, performed by a device, of recognizing an object in an image, according to one or more embodiments.

FIG. 28 illustrates a method, performed by the device 1000, of recognizing an object in an image, according to one or more embodiments.

Referring to (a) and (b) of FIG. 28, the device 1000 may detect an area of an object from the original image 100. Also, the device 1000 may segment the original image 100 into an area of at least one object.

For example, the device 1000 may determine areas indicating a similar color as an area of one object. Also, the device 1000 may detect an edge in the original image by using an edge detection filter, determine a silhouette of the object based on the detected edge and the color similarity, and determine an area specified by the determined silhouette as the area of the object.

Referring to (c) of FIG. 28, the device 1000 may recognize the detected object via machine learning and by using a vision algorithm. For example, the device 1000 may determine that the detected object is a building.

Figure 29:
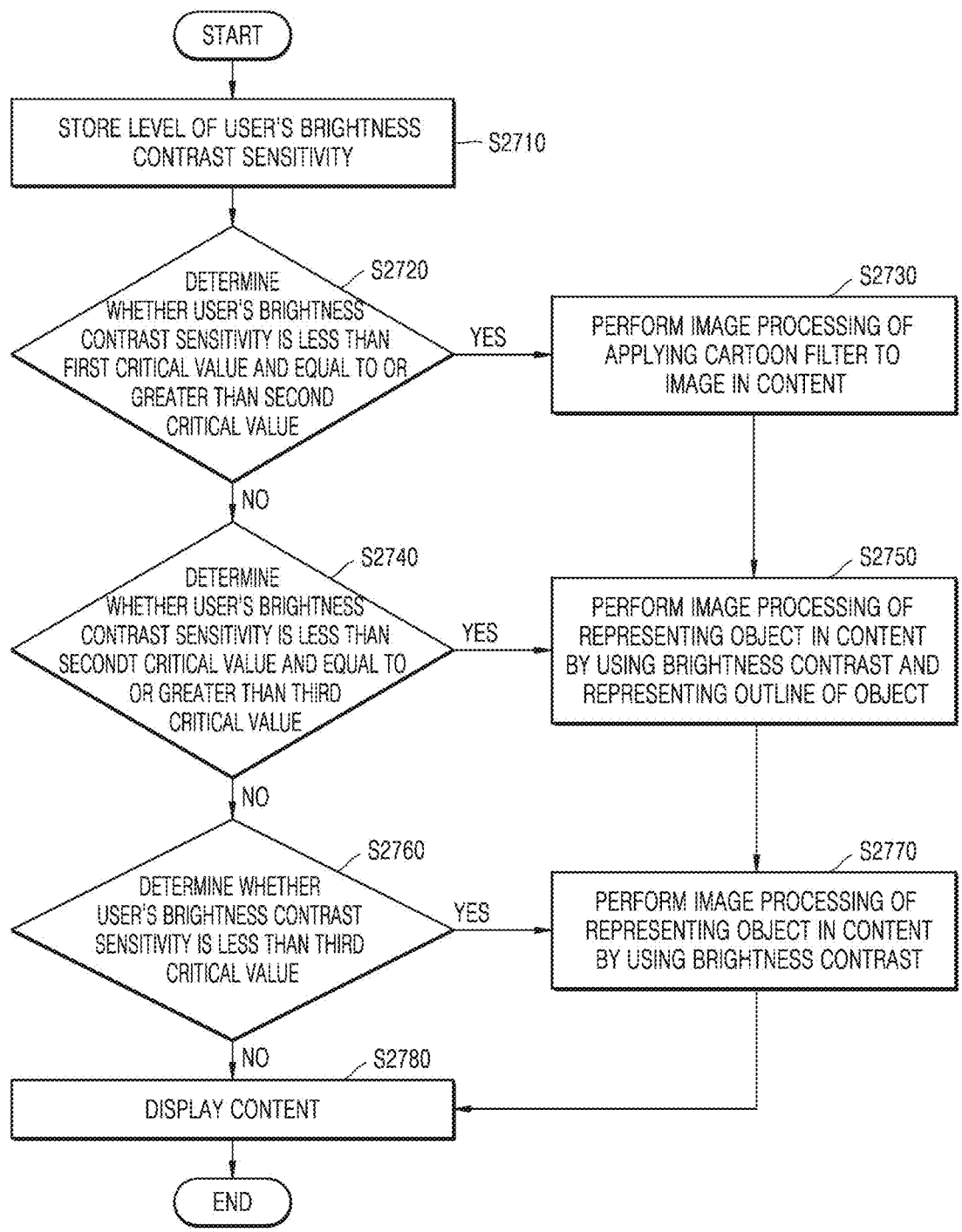
FIG. 29 illustrates a method, performed by a device, of providing a user interface for receiving a user's input for setting a display mode, according to another embodiment.

FIG. 29 illustrates a method, performed by the device 1000, of providing a user interface for receiving a user's input for setting a display mode, according to another embodiment.

Referring to (a) of FIG. 29, the device 1000 may be a TV.

Referring to (b) of FIG. 29, a remote controller for controlling the TV may include a button 2910 for setting a display mode.

Referring to (c) of FIG. 29, when the device 1000 receives a user's input of pressing the button 2910 for setting the display mode, the device 1000 may display the original image 100 in a first mode in which an outline of an object is displayed to be thick by using an adaptive threshold filter in the original image 100. Here, the device 1000 may display an image 2920 indicating that the first mode is selected.

Also, when the device 1000 receives a user's input of pressing the button 2910 for setting the display mode, the device 1000 may display the original image 100 in a second mode in which the object in the original image 100 is represented by using a brightness contrast or along with the brightness contrast, the outline of the object is represented. Here, the device 1000 may display an image 2930 indicating that the second mode is selected.

Also, when the device 1000 receives the user's input of pressing the button 2910 for setting a display mode as the second mode, the device 1000 may directly display the original image 100. Here, the device 1000 may display an image 2940 indicating that a general mode is selected.

Figure 30:
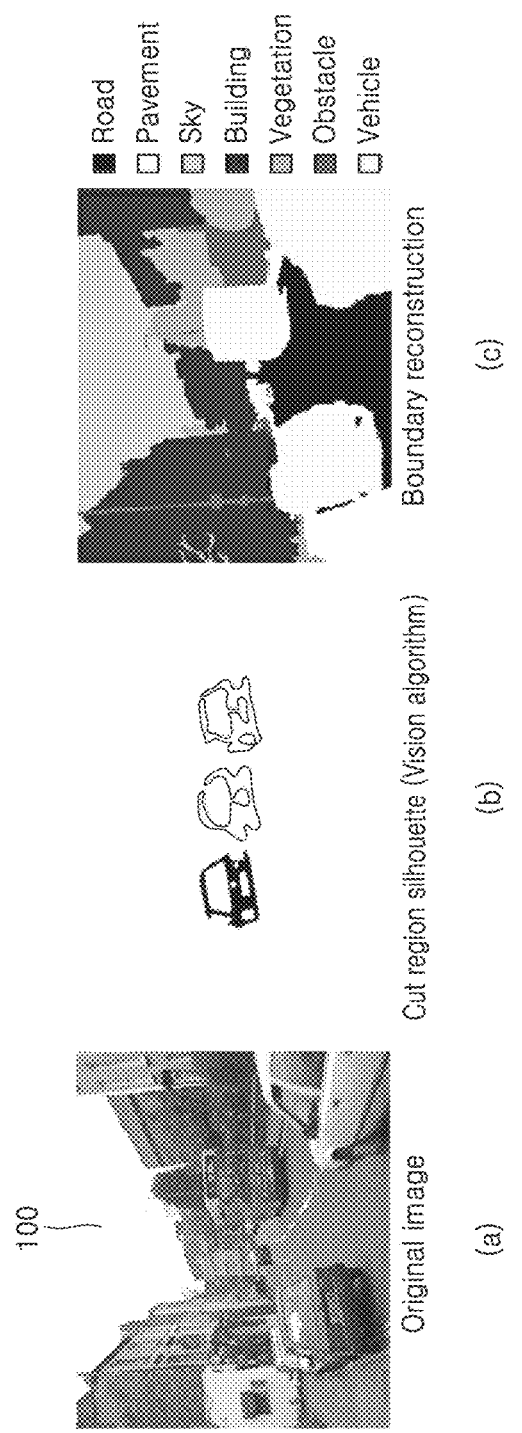
FIG. 30 illustrates a method, performed by a device, of displaying content based on a user's brightness contrast sensitivity and illumination, according to one or more embodiments.

FIG. 30 illustrates a method, performed by the device 1000, of displaying content based on a user's brightness contrast sensitivity and illumination, according to one or more embodiments.

Referring to FIG. 30, a lower portion of the brightness contrast sensitivity inspection label 2920 denotes a higher brightness contrast sensitivity.

Also, the device 1000 may use different image filters for users having the same brightness contrast sensitivity, according to the illumination. For example, when a user having a very low brightness contrast sensitivity goes to an outdoor space of 100,000 Lux from an indoor space of 100 Lux, the device 1000, which has been performing image processing of representing an object by using only a brightness contrast by using a contrast filter, may also represent an outline by using also an edge enhancement filter.

Also, the device 1000 may display the outline of the object as having a decreased thickness as the illumination is decreased, and as having an increased thickness as the illumination is increased.

Figure 31:
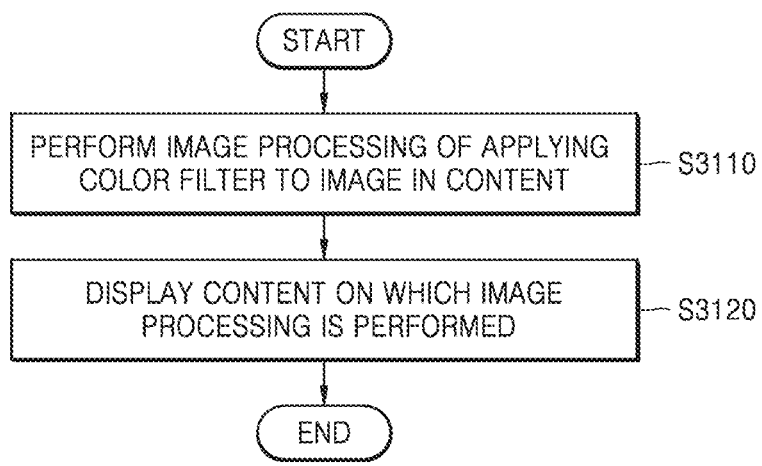
FIG. 31 illustrates a flowchart of a method, performed by a device, of applying a color filter to an image, according to one or more embodiments.

FIG. 31 illustrates a flowchart of a method, performed by the device 1000, of applying a color filter to an image, according to one or more embodiments.

In operation S3110, the device 1000 may perform image processing of applying the color filter to the image in content.

The color filter may be an amber filter. Also, the color filter may include yellow, orange, celadon green, blue, green, and red filters, or a combination thereof. However, the color filter is not limited thereto.

The device 1000 may provide a menu or a button for applying the color filter to an original image. Also, the device 1000 may provide a user interface for selecting a color of the color filter.

In operation S3120, the device 1000 may display content on which the image processing is performed.

In the case of a user having severe glare and light spread due to age-related macular degeneration, the device 1000 may remove glare and light spread by applying the color filter to the original image.

Figure 32:
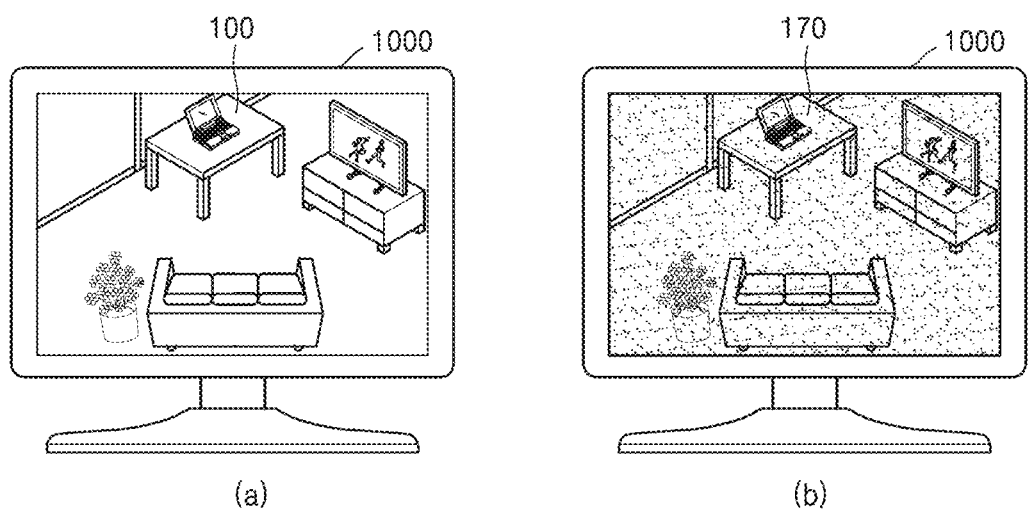
FIG. 32 illustrates a method, performed by a device, of applying a color filter to an image, according to one or more embodiments.

FIG. 32 illustrates a method, performed by the device 1000, of applying a color filter to an image, according to one or more embodiments.

Referring to (a) and (b) of FIG. 32, when the device 1000 receives a user's input for applying a color filter while displaying an original image 100, the device 1000 may display an image 170 generated by applying the color filter to the original image 100.

Figure 33:
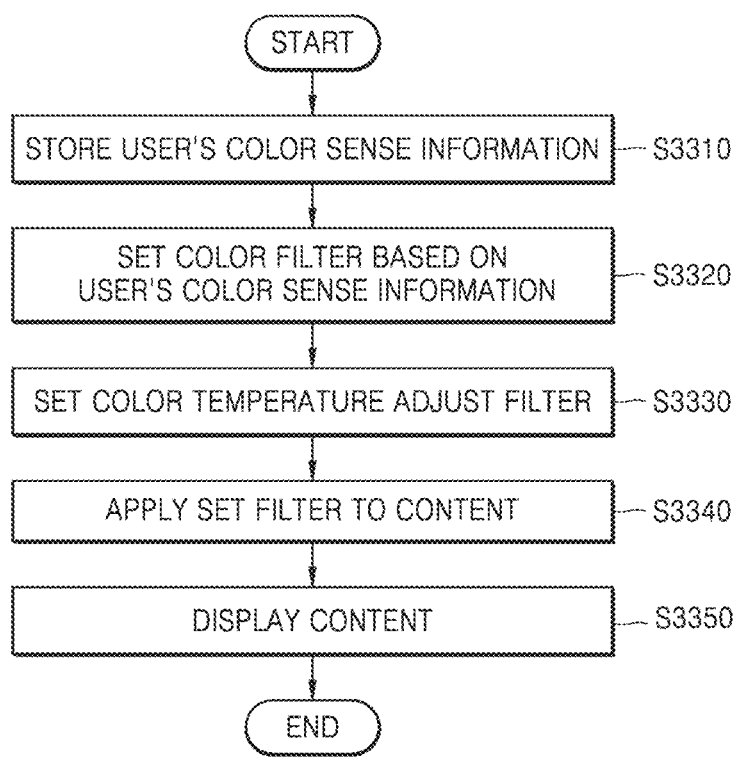
FIG. 33 is a flowchart of a method, performed by a device, of correcting a color of an image based on user color sense information, according to one or more embodiments.

FIG. 33 is a flowchart of a method, performed by the device 1000, of correcting a color of an image based on user color sense information, according to one or more embodiments.

In operation S3310, the device 1000 may store the user color sense information.

The color sense may denote an ability to distinguish and recognize colors. A person without the color sense with respect to a certain color may be referred to as a color-blind person, and a person with a weak color sense may be referred to as a person having color weakness. The color-blind person may be divided into red-green blindness and blue-yellow blindness and the red-green blindness may be divided into red blindness and green blindness.

The device 1000 may provide a user interface for receiving information about the user's color sense. For example, the device 1000 may display a color-blindness inspection label and may receive a recognized number from a user to receive the user color sense information.

In operation S3320, the device 1000 may set a color filter based on the user color sense information.

For example, when the user is a protanomal, the device 1000 may set a red emphasis filter to increase the value of the red color in each pixel in an original image.

In operation S3330, the device 1000 may set a color temperature adjust filter.

A color temperature (Kelvin Degrees, K) is a color of a light source, the color being represented by a physical numerical value. When the color temperature is decreased, the red color may be indicated and when the color temperature is increased, the blue color may be indicated. When the color temperatures are different, even the same color may be differently viewed. Thus, when the user is a protanomal, the device 1000 may set the color temperature adjust filter to increase the color temperature of an image so that the image indicates the red color.

In operation S3340, the device 1000 may apply a set filter to content.

The device 1000 may correct a color of an image in the content by applying the set color filter and the color temperature adjust filter to the image.

In operation S3350, the device 1000 may display the content.

The device 1000 may display the image, the color of which is corrected.

In FIG. 33, the method of correcting the color of the image by using the color filter and the color temperature adjust filter is described. However, according to an embodiment, the color of the image may be corrected by using only one of the color filter and the color temperature adjust filter.

Figure 34:
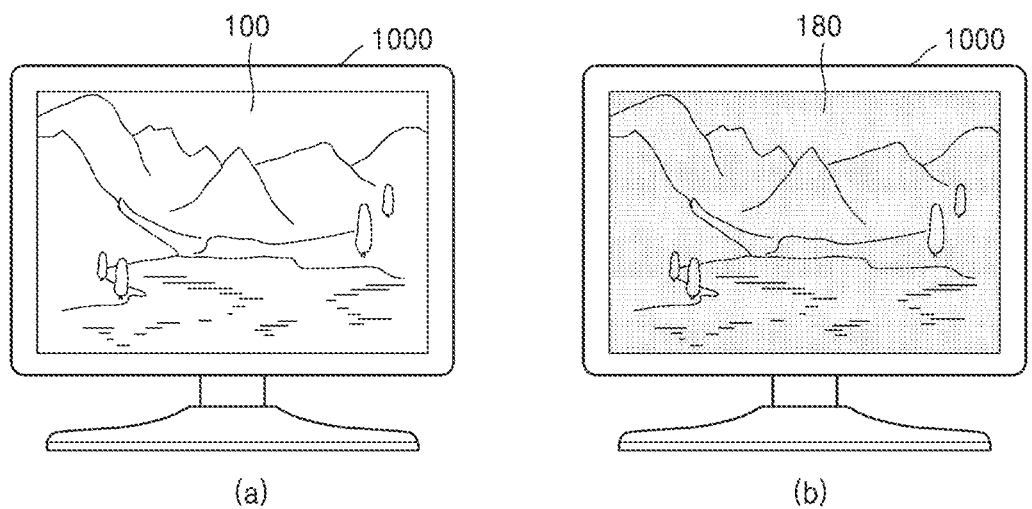
FIG. 34 illustrates a method, performed by a device, of applying a color filter to an image, according to one or more embodiments.

FIG. 34 illustrates a method, performed by the device 1000, of applying a color filter to an image, according to one or more embodiments.

Referring to (a) and (b) of FIG. 34, when the device 1000 receives a user's input for requesting color correction while the device 1000 displays the original image 100, the device 1000 may display an image 180, the color of which is corrected by using a color filter that is set by a user and a color temperature adjust filter.

Figure 35:
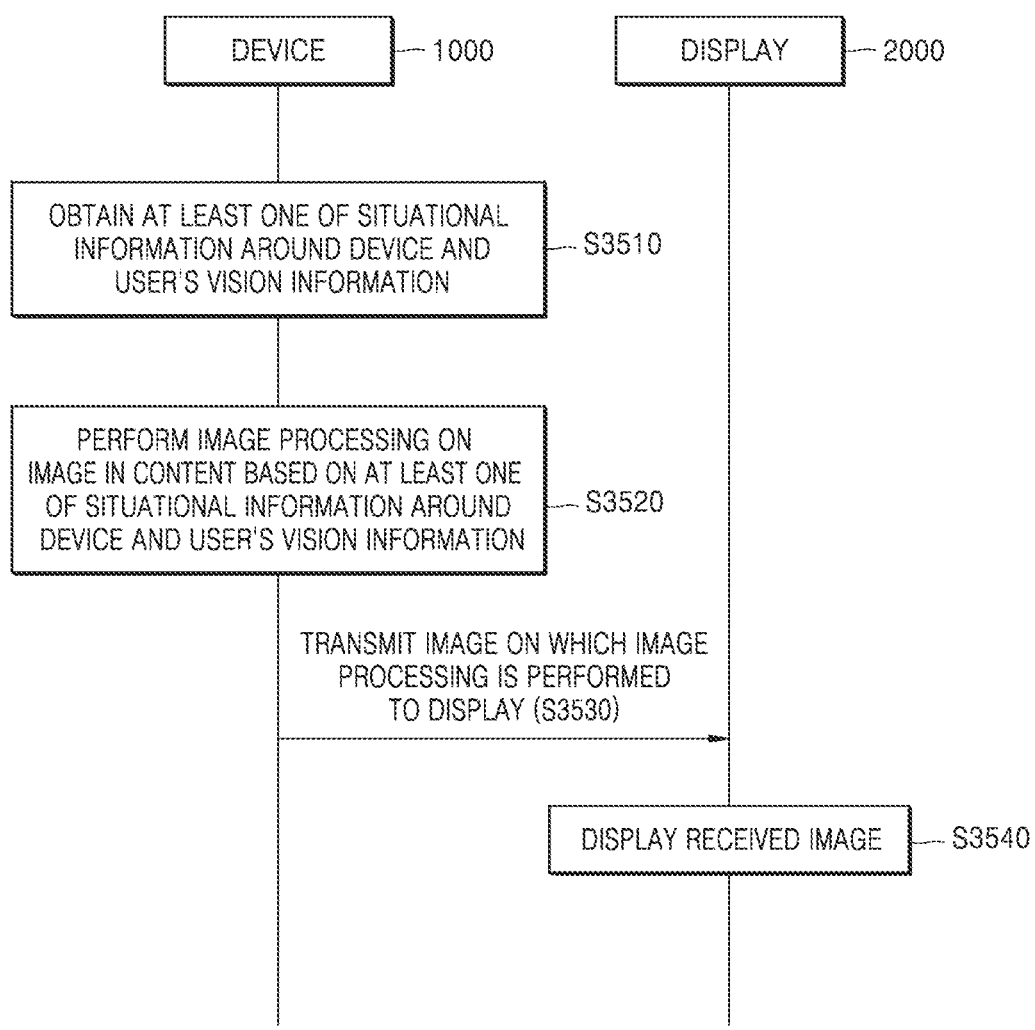
FIG. 35 is a flowchart of a method, performed by a device, of displaying an image on which image processing is performed, by using a separate display, according to one or more embodiments.

FIG. 35 is a flowchart of a method, performed by the device 1000, of displaying an image on which image processing is performed, by using a separate display, according to one or more embodiments.

In operation S3510, the device 1000 may obtain at least one of situational information about a situation around the device 1000 and user vision information. Operation S3510 may be described by referring to operation S210 or operation S220 of FIG. 2.

In operation S3520, the device 1000 may perform image processing on an image in content based on at least one of the situational information about the situation around the device 1000 and the user vision information. Operation S3520 may be described with reference to operation S230 of FIG. 2.

In operation S3530, the device 1000 may transmit an image on which image processing is performed to a display 2000.

The device 1000 may be connected to the display 2000 via short-range wireless communication. Also, the device 1000 may be connected to the display 2000 via wires. Also, the device 1000 may be connected to a hardware port in the display 2000.

In operation S3540, the display 2000 may display the received image.

Figure 36:
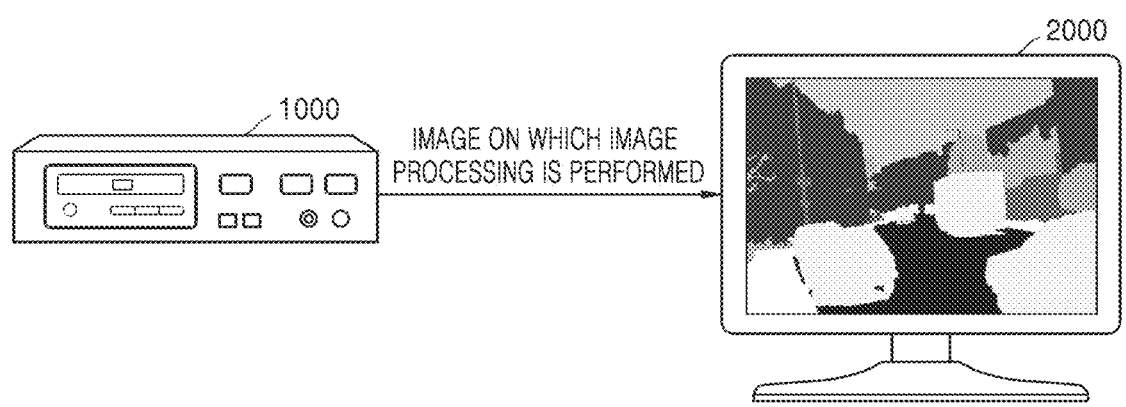
FIGS. 36 through 38 illustrate a method, performed by a device, of displaying an image on which image processing is performed, by using a separate display, according to one or more embodiments.
Figure 37:
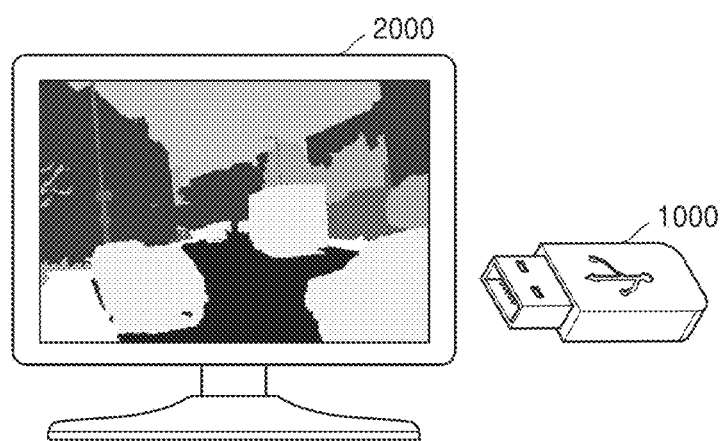
Figure 38:
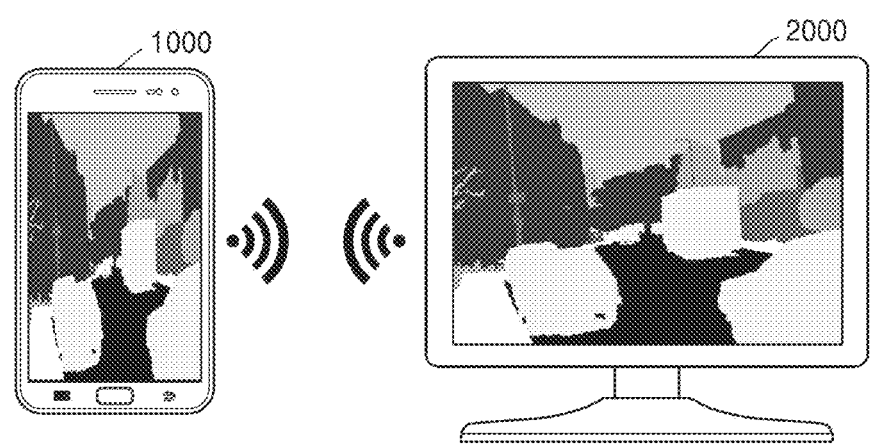

FIGS. 36 through 38 illustrate a method, performed by the device 1000, of displaying an image on which image processing is performed, by using the separate display 2000, according to one or more embodiments.

Referring to FIG. 36, the device 1000 may be a settop box. The settop box 1000 may obtain illumination information by controlling an illumination sensor provided in the settop box 1000 and may receive the illumination information from the display 2000.

The settop box 1000 may perform image processing on an image received from an external server based on at least one of illumination and user's contrast sensitivity, and may transmit the image on which the image processing is performed to the display 2000 that is connected thereto.

Referring to FIG. 37, the device 1000 may be a dongle. The dongle 1000 may denote an external peripheral device that is connected to other devices and is used for being provided with an additional function that is not provided by the other devices. The dongle 1000 may be connected to a universal serial bus (USB) port, a high-definition multimedia interface (HDMI) port, or a component of the display 2000.

The dongle 1000 may obtain illumination information by controlling an illumination sensor provided in the dongle 1000 or obtain the illumination information from a control device controlling the display 2000 or the dongle 1000.

The dongle 1000 may receive an original image from the display 2000, perform image processing on the received original image, and transmit the image on which image processing is performed to the display 2000.

Also, the dongle 1000 may receive content from an external server. For example, in response to a request of the control device controlling the dongle 1000, the dongle 1000 may receive a URL of content from the control device and download the content from the external server through the URL. Also, the dongle 1000 may perform image processing on an image in the downloaded content and may transmit the image on which the image processing is performed to the display. The control device may be the display 2000 and may be other devices connected to the dongle 1000 via short-range wireless communication.

Referring to FIG. 38, the device 1000 may be a mobile device. The mobile device 1000 may obtain illumination information by controlling the illumination sensor provided in the mobile device 1000 and may obtain the illumination information from the display 2000.

Also, the mobile device 1000 may perform image processing on an image stored in the mobile device 1000 or an image received from the outside and may transmit the image on which image processing is performed to the display 2000.

Figure 39:
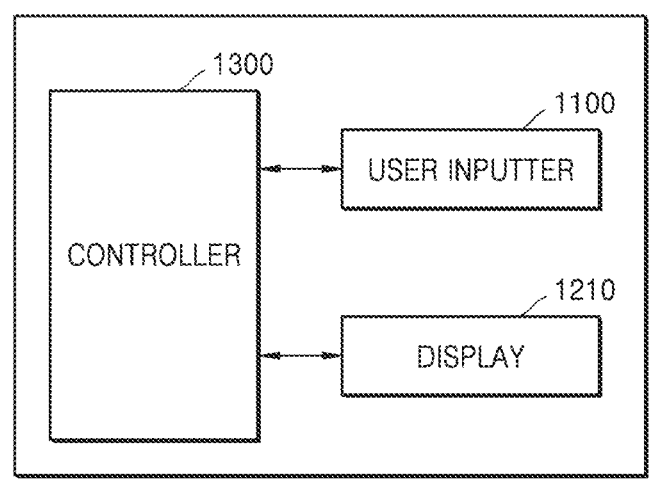
FIGS. 39 and 40 are block diagrams of a device according to one or more embodiments.
Figure 40:
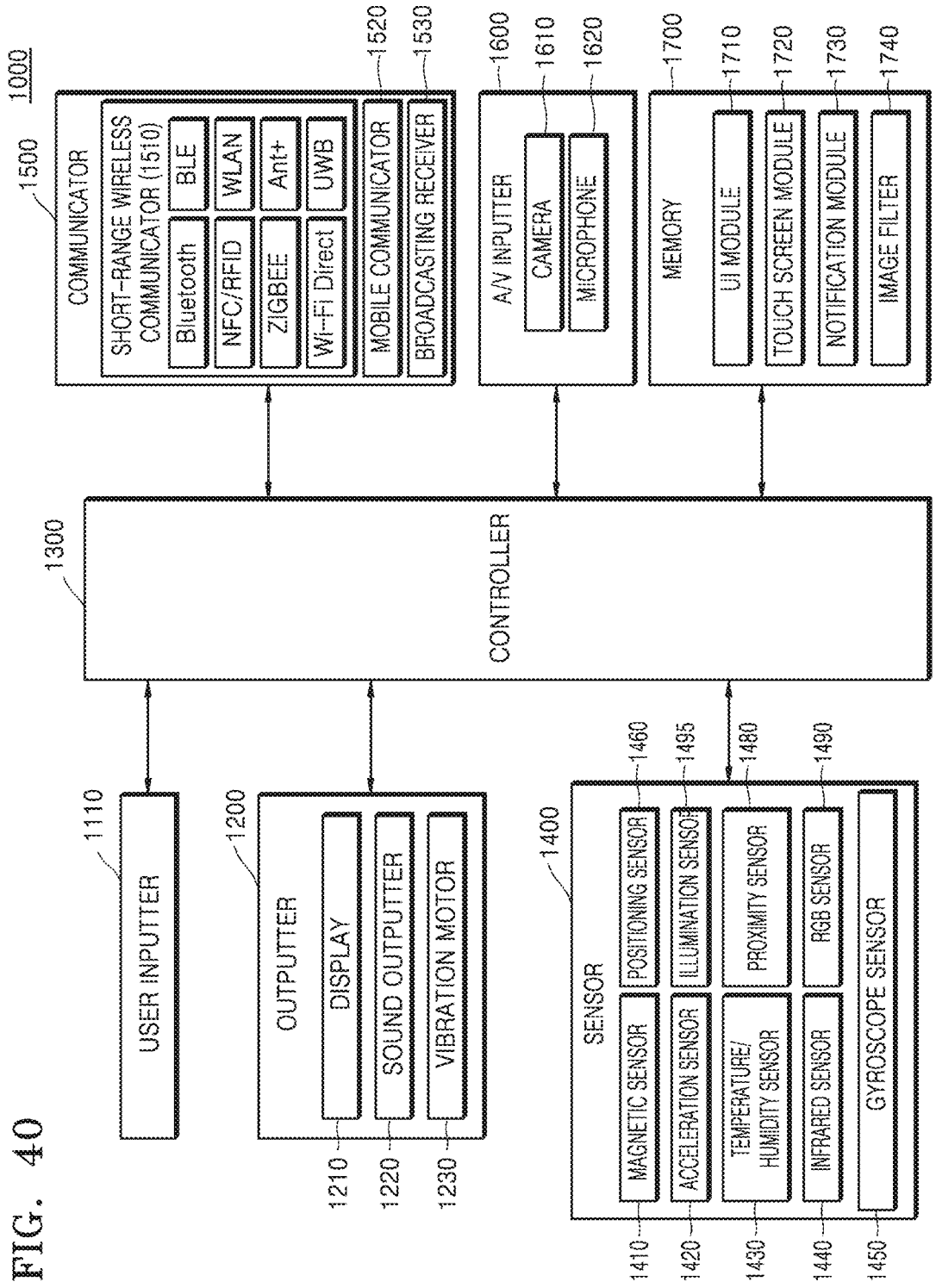

FIGS. 39 and 40 are block diagrams of the device 1000 according to one or more embodiments.

As illustrated in FIG. 39, the device 1000 according to one or more embodiments may include a user inputter 1100, a display 1210, and a controller 1300. However, not all illustrated components of FIG. 39 are essential components of the device 1000. The device 1000 may be realized by including more components than the illustrated components of FIG. 39 or by including less components than the illustrated components of FIG. 39.

For example, the device 1000 according to one or more embodiments may include only the controller 1300 or may include only the user inputter 1100 and the controller 1300.

Also, for example, as illustrated in FIG. 40, the device 1000 according to one or more embodiments may further include an outputter 1200, a communicator 1500, a sensor 1400, and an audio/video (A/V) inputter 1600, and a memory 1700, in addition to the user inputter 1100, the display 1210, and the controller 1300.

The user inputter 1100 may denote a device used by a user to input data to control the device 1000. For example, the user inputter 1100 may include a key pad, a dome switch, a touch pad (a touch capacitance method, a pressure resistive method, an infrared detection method, a surface ultrasonic conductive method, a integral tension measuring method, a piezo effect method, etc.), a jog wheel, a jog switch, etc., but it is not limited thereto.

The user inputter 1100 may receive a user's input for generating an image that is easy to recognize by performing image processing on original image according to user environmental information or user vision information, and displaying the generated image.

The outputter 1200 may output an audio signal, a video signal, or a vibration signal and may include the display 1210, a sound outputter 1220, and a vibration motor 1230.

The display 1210 may display information processed by the device 1000. For example, the display 1210 may display a user interface for generating an image that is easy to recognize by performing image processing on an original image according to user environmental information or user vision information, and displaying the generated image.

Also, the display 1210 may display the image on which the image processing is performed.

Meanwhile, when the display 1210 and a touch pad are layered to form a touch screen, the display 1210 may be used as an inputter as well as an outputter. The display 1210 may include at least one of a liquid crystal display, a thin film transistor-liquid crystal display, an organic light-emitting diode, a flexible display, a three-dimensional (3D) display, and an electrophoretic display.

The sound outputter 1220 may output audio data received from the communicator 1500 or stored in the memory 1700. The vibration motor 1230 may output a vibration signal.

The controller 1300 may control general operations of the device 1000. For example, the controller 1300 may generally control the user inputter 1100, the outputter 1200, the sensor 1400, the communicator 1500, the A/V inputter 1600, etc. by executing programs stored in the memory 1700. The controller 1300 may control operations of the device 1000 in order to perform the functions of the device 1000 described with reference to FIGS. 1 through 38.

In detail, the controller 1300 may obtain at least one of situational information about a situation around the device and user vision information, perform image processing on content that is reproduced, and control the display 1210 to display the content on which the image processing is performed.

Also, the controller 1300 may obtain peripheral illumination information of the device, may determine, based on the illumination information, a thickness of an outline of an object included in the content reproduced by the device, may perform image processing on the content such that the outline of the object is represented by using a line having the determined thickness, and may control the display 1210 to display the content on which the image processing is performed.

Also, the controller 1300 may determine whether the obtained illumination is equal to or greater than a first threshold value or equal to or less than the first threshold value.

Also, the controller 1300 may perform image processing of applying an adaptive threshold filter to an image in the content.

Also, the controller 1300 may perform image processing of representing the object in the content by using brightness contrast and indicating the outline of the object.

Also, the controller 1300 may perform image processing of representing the object in the content by using brightness contrast.

Also, the controller 1300 may perform image processing of changing the thickness of the outline of the object in the content as a first thickness.

Also, the controller 1300 may determine a contrast range of a first frame in the content and a second frame that is a frame next to the first frame, determine a thickness of the outline, the thickness corresponding to the contrast range, and generate an image indicating an outline of an object included in the second frame as having the determined thickness.

The controller 1300 may detect a color of the object in the content and represent the outline of the object by using a complementary color of the color of the object.

Also, the controller 1300 may detect a piece of text from the content and represent the detected piece of text as having a first color and a background of the piece of text as having a second color.

Also, the controller 1300 may detect at least one piece of text in content, determine a first piece of text based on a location and a size of the at least piece of text in the content, and perform image processing on the first piece of text based on a location and a size of the first text.

Also, the controller 1300 may control the communicator 1500 to receive broadcasting content, detect at least one keyword from EPG information from the received broadcasting content, detect a plurality of pieces of text from the content, and represent a piece of text corresponding to the at least one keyword, from among the plurality of pieces of text, in an emphasized manner.

Also, the controller 1300 may determine whether a user's brightness contrast sensitivity is equal to or greater than a first threshold value or equal to or less than the first threshold value.

Also, the controller 1300 may perform image processing of applying a color filter to an image in the content.

Also, the controller 1300 may set the color filter based on user color sense information. Also, the controller 1300 may set a color temperature adjust filter.

The sensor 1400 may sense a state of the device 1000 or a state around the device 1000 and transmit the sensed information to the controller 1300.

Also, the controller 1300 may control the communicator 1500 to transmit the image on which the image processing is performed to another device connected to the device 1000.

The sensor 1400 may include at least one of a magnetic sensor 1410, an acceleration sensor 1420, a temperature/humidity sensor 1430, an infrared sensor 1440, a gyroscope sensor 1450, a positioning sensor (for example, a global positioning sensor (GPS)) 1460, an illumination sensor 1495, a proximity sensor 1480, or an RGB sensor (a luminance sensor) 1490, but it is not limited thereto. A function of each sensor may be intuitively inferred by one of ordinary skill in the art based on its name, and thus, its detailed description will not be given. A function of each sensor may be intuitively inferred by one of ordinary skill in the art based on its name, and thus, its detailed description will not be given.

The communicator 1500 may include one or more components configured to enable the device 1000 to communicate with other devices. For example, the communicator 1500 may include a short-range wireless communicator 1510, a mobile communicator 1520, and a broadcasting receiver 1530.

Also, the communicator 1500 may include a communication interface performing communication with external devices. For example, the communicator 1500 may include a first communication interface communicating with an external device 2000 and a second communication interface communicating with a server (not shown) for downloading a control application. However, the realization of the communicator 1500 is not limited thereto.

The short-range wireless communicator 151 may include a Bluetooth communicator, a Bluetooth low energy (BLE) communicator, a near field communicator (NFC), a WLAN (or Wi-Fi) communicator, a Zigbee communicator, an infrared data association (IrDA) communicator, a Wi-Fi direct (WFD) communicator, a ultrawide band (UWB) communicator, an Ant+ communicator, etc., but is not limited thereto.

The mobile communicator 1520 may transceive wireless signals with at least one of a base station, an external terminal, or a server, via a mobile communication network. Here, the wireless signal may include a sound call signal, a video-telephony call signal, or various types of data based on transceiving of text/multimedia message.

The broadcasting receiver 1530 may receive a broadcasting signal and/or broadcasting-related information from the outside via broadcasting channels. The broadcasting channels may include satellite channels and ground wave channels. According to an embodiment of the disclosure, the device 1000 may not include the broadcasting receiver 1530.

The A/V inputter 1600 may be configured to input an audio signal or a video signal and may include a camera 1610 and a microphone 1620.

The memory 1700 may store programs for a processing and controlling operation of the controller 1300 and may store data input to the device 1000 or output from the device 1000.

The memory 1700 may include at least one type of storage medium from among a flash memory type memory, a hard disk type memory, a multimedia card micro type memory, a card type memory (for example, an SD or XD memory), random-access memory (RAM), static RAM (SRAM), read-only memory (ROM), electrically erasable programmable ROM (EEPROM), programmable ROM (PROM), magnetic memory, magnetic disks, and optical disks.

The programs stored in the memory 1700 may be classified into a plurality of modules according to their functions. For example, the programs may be classified into a UI module 1710, a touch screen module 1720, a notification module 1730, an image filter module 1740, etc.

The memory 1700 may store a user's brightness contrast sensitivity. The memory 1700 may store user color sense information. The memory 1700 may store color information about a set of colors, for which the user's color contrast sensitivity is equal to or less than a reference value.

The UI module 1710 may provide a specialized UI or graphics user interface (GUI), etc., synchronized to the device 1000, according to applications. The touch screen module 1720 may sense a touch gesture of a user on a touch screen and may transmit information about the touch gesture to the controller 1300. The touch screen module 1720 according to one or more embodiments of the disclosure may recognize and analyze a touch code. The touch screen module 1720 may be formed as additional hardware including a controller.

The one or more embodiments of the disclosure may be embodied as a recording medium including instructions executable by a computer, such as program modules executed by computers. The computer-readable medium may include any usable medium that may be accessed by computers and may include volatile and non-volatile media, and detachable and non-detachable media. Also, the computer-readable medium may include a computer storage medium and a communication medium. The computer storage medium may include all of volatile and non-volatile media, and detachable and non-detachable media which are realized based on any methods and technologies to store information including computer-readable instructions, data structures, program modules, or other data. The communication medium may typically include computer-readable instructions, data structures, program modules, other data of modified data signals, such as carrier waves, other transmission mechanisms, or other information transmission media.

Also, in this specification, the term "unit" may be a hardware component, such as a processor or a circuit, and/or a software component executed by the hardware component, such as the processor.

While the embodiments of the disclosure have been described in detail, it will be understood by one of ordinary skill in the art that various changes in form and details may be made therein without departing from the spirit and scope of the disclosure as defined by the following claims. Therefore, the embodiments described herein should be understood as examples in all aspects and should not be construed as limitations. For example, each of components described as a single unit may be executed in a distributed fashion, and likewise, components described as being distributed may be executed in a combined fashion.

The scope of the disclosure is defined by the appended claims, rather than the detailed description above, and it will be understood that all of the modified or changed forms derived from the meaning and the scope of the claims and the equivalents thereof are encompassed within the range of the disclosure.

The invention claimed is:

1. A device comprising:
one or more processors;
a memory storing one or more programs including instructions which, when executed by the one or more processors, cause the one or more processors to:
control to obtain illumination information about illumination around the device,
control to determine, based on the illumination information, a thickness of an outline of an object included in content reproduced by the device, and
control to perform image processing on the content such that the outline of the object is represented as having the determined thickness,
a display displaying the content on which the image processing is performed,
detect a color of the object and represent the outline of the object by using a complementary color of the color of the object; and
a storage storing color information about a set of colors for which a user's color contrast sensitivity is equal to or less than a reference value,
wherein the one or more processors is further configured to:
detect the color of the object and a color of a background of the object, and
when the detected color of the object and the detected color of the background of the object are the set of colors, perform image processing on the content such that the outline of the object is represented as having the complementary color of the color of the object.

2. The device of claim 1, wherein the one or more processors is further configured to detect text from the content and represent the text by using a first color and represent a background of the text by using a second color.

3. The device of claim 2, wherein, when the reproduced content is a broadcasting program, the controller is further configured to:
detect at least one keyword from electronic program guide (EPG) information about the broadcasting program, and
when the text indicates the detected at least one keyword, represent the text by using the first color and represent the background of the text by using the second color.

4. The device of claim 2, wherein the one or more processors is further configured to represent the text by using the first color and represent the background of the text by using the second color, based on a location and a size of the text.

5. The device of claim 1, wherein the one or more processors is further configured to determine a contrast range of a first frame of the reproduced content and a second frame that is a frame next to the first frame and represent an outline of an object included in the second frame as having a thickness corresponding to the contrast range.

6. The device of claim 1, wherein, the one or more processors is further configured to determine the thickness of the outline to be thicker as illumination in the obtained illumination information is higher.

7. The device of claim 1, wherein the one or more processors is further configured to determine the thickness of the outline by further taking into account a user's brightness contrast sensitivity.

8. The device of claim 1, wherein the one or more processors is further configured to:
   detect a plurality of objects in the content,
   determine a brightness value corresponding to each of the plurality of objects, and
   perform image processing on the content such that each of the plurality of objects is represented as having the corresponding brightness value.

9. An image processing method comprising:
   obtaining illumination information about illumination around a device;
   determining, based on the illumination information, a thickness of an outline of an object included in content reproduced by the device;
   performing image processing on the content such that the outline of the object is represented as having the determined thickness;
   displaying the content on which the image processing is performed; and
   detecting a color of the object and representing the outline of the object by using a complementary color of the color of the object,
   wherein the representing of the outline of the object by using the complementary color of the color of the object comprises:
   storing color information about a set of colors for which a user's color contrast sensitivity is equal to or less than a reference value,
   detecting the color of the object and a color of a background of the object, and
   when the detected color of the object and the detected color of the background of the object are the set of colors, performing image processing on the content such that the outline of the object is represented as having the complementary color of the color of the object.

10. The image processing method of claim 9, further comprising:
    detecting text from the content; and
    representing the text by using a first color and representing a background of the text by using a second color.

11. The image processing method of claim 10, wherein the representing of the text by using the first color and representing the background of the text by using the second color comprises:
    when the reproduced content is a broadcasting program, detecting at least one keyword from electronic program guide (EPG) information about the broadcasting program; and
    when the text indicates the detected at least one keyword, representing the text by using the first color and representing the background of the text by using the second color.

12. The image processing method of claim 9, further comprising:
    determining a contrast range of a first frame of the reproduced content and a second frame that is a frame next to the first frame; and
    representing an outline of an object included in the second frame as having a thickness corresponding to the contrast range.

13. The image processing method of claim 9, wherein the determining of the thickness of the outline of the object included in the reproduced content by the device, based on the illumination information, comprises determining the thickness of the outline to be thicker as illumination in the obtained illumination information is higher.

14. The image processing method of claim 9, wherein the determining of the thickness of the outline of the object included in the content reproduced by the device, based on the illumination information, comprises determining the thickness of the outline by further taking into account a user's brightness contrast sensitivity.

15. The image processing method of claim 9, further comprising:
    detecting a plurality of objects in the content;
    determining a brightness value corresponding to each of the plurality of objects; and
    performing image processing on the content such that each of the plurality of objects is represented as having the corresponding brightness value.

16. A non-transitory computer-readable recording medium having recorded thereon a program for executing the method of claim 9.

* * * * *